US012639341B2

(12) United States Patent
Pena Pena et al.

(10) Patent No.: US 12,639,341 B2
(45) Date of Patent: May 26, 2026

(54) IDENTIFYING ARTIFACTS DIFFERENCES USING GRAPH NEURAL NETWORKS

(71) Applicant: Intuit Inc., Mountain View, CA (US)

(72) Inventors: Karelia Del Carmen Pena Pena, Wilmington, DE (US); Richard J. Becker, St. Albert (CA)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/899,412

(22) Filed: Sep. 27, 2024

(65) Prior Publication Data

US 2026/0093717 A1     Apr. 2, 2026

(51) Int. Cl.
| | |
|---|---|
| *G06F 16/28* | (2019.01) |
| *G06F 16/93* | (2019.01) |
| *G06N 5/022* | (2023.01) |

(52) U.S. Cl.
CPC ............ *G06F 16/288* (2019.01); *G06F 16/93* (2019.01); *G06N 5/022* (2013.01)

(58) Field of Classification Search
CPC ........ G06F 16/288; G06F 16/93; G06N 5/022
See application file for complete search history.

(56) References Cited

U.S. PATENT DOCUMENTS

| | | | | |
|---|---|---|---|---|
| 8,458,194 B1 * | 6/2013 | Procopio | ................. | G06F 16/35 |
| | | | | 707/749 |
| 2003/0135607 A1 * | 7/2003 | Bernard | ................. | G06F 16/958 |
| | | | | 709/224 |
| 2006/0047637 A1 * | 3/2006 | Meyerzon | ........... | G06F 16/3329 |

(Continued)

FOREIGN PATENT DOCUMENTS

| | | | | | |
|---|---|---|---|---|---|
| CN | 118069791 A | * | 5/2024 | ........... | G06F 16/335 |
| CN | 118296132 A | * | 7/2024 | ............. | G06N 5/041 |

(Continued)

OTHER PUBLICATIONS

Wu, Wei, et al., "Hashing-Accelerated Graph Neural Networks for Link Prediction," WWW '21: Proceedings of the Web Conference 2021, Apr. 19-23, 2021, 12 pages, arXiv:2105.14280v1, Association for Computing Machinery, Ljubljana, Slovenia.

(Continued)

*Primary Examiner* — Neveen Abel Jalil
*Assistant Examiner* — Hubert Cheung
(74) *Attorney, Agent, or Firm* — Dinsmore & Shohl LLP

(57) ABSTRACT

Certain aspects of the disclosure provide for a difference analysis method. In certain aspects, a difference analysis method may include embedding a set of source documents into a knowledge graph, wherein each source document is embedded in the knowledge graph as a set of segments and a set of associations connecting two or more segments. A difference may be determined between a first segment in the set of segments of a first source document and a second segment in the set of segments of a second source document. In response to determining the difference between the first segment in the set of segments of the first source document and the second segment in the set of segments of the second source document, determining a significance of the difference on the second source document based on one or more associations of the set of associations connected to the second segment.

20 Claims, 15 Drawing Sheets

(56)                    References Cited

U.S. PATENT DOCUMENTS

| | | | | |
|---|---|---|---|---|
| 2010/0138377 | A1* | 6/2010 | Wright | G06N 5/01 |
| | | | | 706/52 |
| 2014/0280204 | A1* | 9/2014 | Avery | G06F 16/245 |
| | | | | 707/748 |
| 2021/0004582 | A1* | 1/2021 | Evans | G06F 16/9014 |
| 2021/0056150 | A1* | 2/2021 | Karandish | G06F 16/3329 |
| 2021/0271718 | A1* | 9/2021 | Agarwal | G06F 16/2474 |
| 2022/0019905 | A1* | 1/2022 | Meyerzon | G06N 3/045 |
| 2022/0261668 | A1* | 8/2022 | Stumpe | G06N 3/045 |
| 2022/0269884 | A1* | 8/2022 | Walters | G06F 40/166 |
| 2023/0022673 | A1* | 1/2023 | Derzsy | G06N 5/022 |
| 2023/0132545 | A1* | 5/2023 | Janik | G06N 5/022 |
| | | | | 706/45 |
| 2024/0028631 | A1* | 1/2024 | Gong | G06F 16/3344 |
| 2024/0256592 | A1* | 8/2024 | O'Neill | G06F 16/483 |
| 2024/0346362 | A1* | 10/2024 | Andre | G06N 3/0455 |
| 2025/0156484 | A1* | 5/2025 | Rankin | G06N 3/045 |

FOREIGN PATENT DOCUMENTS

| | | | | | | |
|---|---|---|---|---|---|---|
| CN | 118506619 | A | * | 8/2024 | | G08G 5/30 |
| CN | 118551040 | A | * | 8/2024 | | G06T 17/00 |
| CN | 118551836 | A | * | 8/2024 | | G06N 3/08 |
| CN | 118761736 | A | * | 10/2024 | | G06N 20/00 |
| KR | 102464999 | B1 | * | 11/2022 | | G06N 3/08 |
| WO | WO-2022019974 | A1 | * | 1/2022 | | G06F 18/23 |

OTHER PUBLICATIONS

Zhang, Muhan, et al., "Link Prediction Based on Graph Neural Networks," 32nd Conference on Neural Information Processing Systems (NeurIPS 2018), 2018, 11 pages, Association for Computing Machinery, Montréal, Canada.

Tang, Jianheng, et al., "Robust Attributed Graph Alignment via Joint Structure Learning and Optimal Transport," Apr. 20, 2023, 14 pages, arXiv:2301.12721v2, Computing Research Repository (CoRR)—Cornell University, Ithaca, NY, USA.

Author Unknown, "Fast Random Projection—Neo4j Graph Data Science," Neo4j Docs, 19 pages, neo4j.com/docs/graph-data-science/current/machine-learning/node-embeddings/fastrp/, accessed Sep. 19, 2024.

Schlichtkrull, Michael et al., "Modeling Relational Data with Graph Convolutional Networks," Oct. 26, 2017, 9 pages, arXiv:1703.06103v4, Computing Research Repository (CoRR)—Cornell University, Ithaca, NY, USA.

* cited by examiner

600

Predict links
602

Knowledge Graph Database
110

Determine difference
604

Extract Entity and Edge(s)
606

Catalog Difference
608

Score & Rank Difference
610

Determine Significance
612

LLM
620

Difference and Significance
614

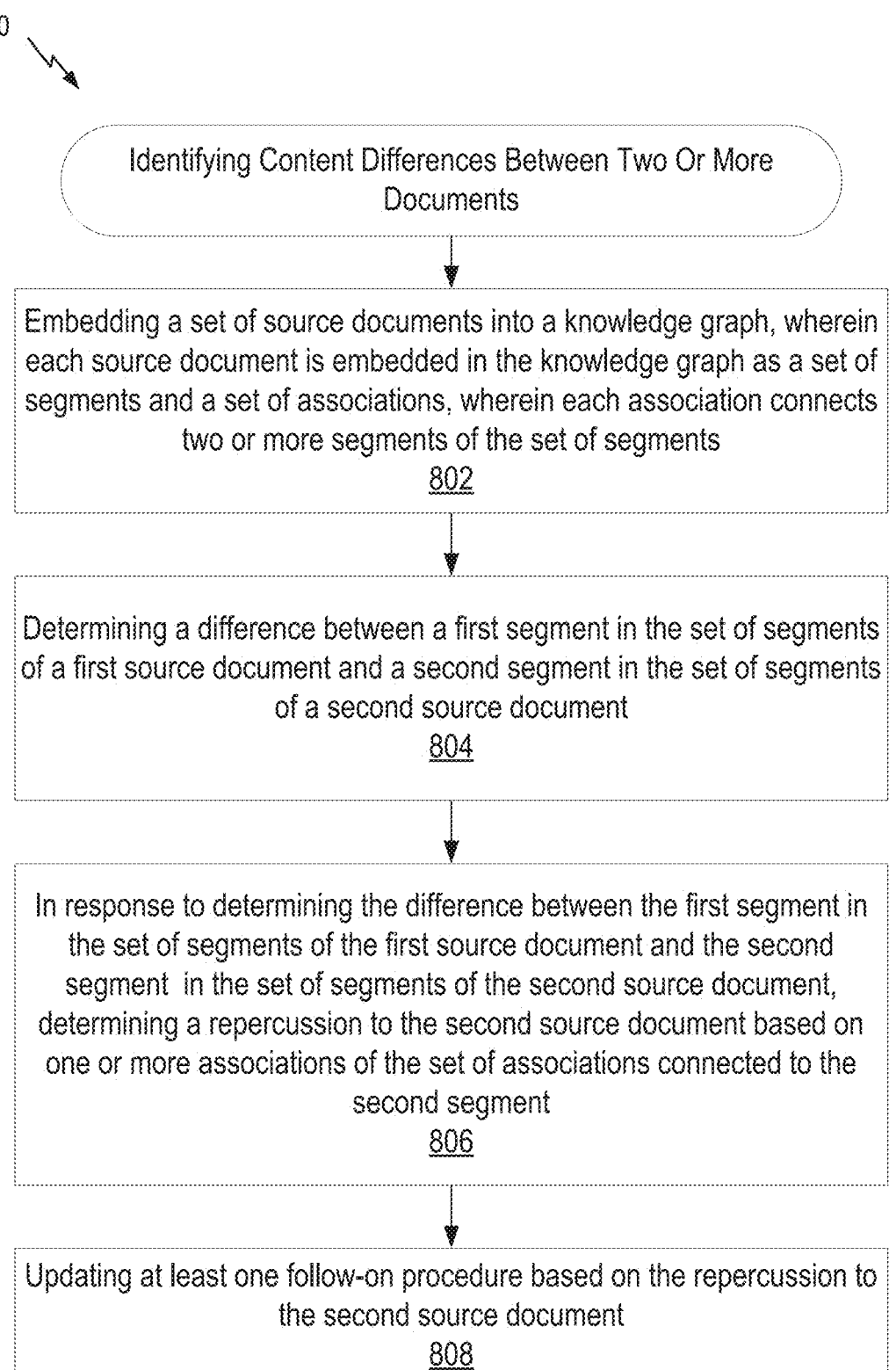

800

Identifying Content Differences Between Two Or More Documents

Embedding a set of source documents into a knowledge graph, wherein each source document is embedded in the knowledge graph as a set of segments and a set of associations, wherein each association connects two or more segments of the set of segments
802

Determining a difference between a first segment in the set of segments of a first source document and a second segment in the set of segments of a second source document
804

In response to determining the difference between the first segment in the set of segments of the first source document and the second segment in the set of segments of the second source document, determining a repercussion to the second source document based on one or more associations of the set of associations connected to the second segment
806

Updating at least one follow-on procedure based on the repercussion to the second source document
808

*FIG. 8*

IDENTIFYING ARTIFACTS DIFFERENCES USING GRAPH NEURAL NETWORKS

BACKGROUND

Field

Aspects of the present disclosure relate to difference analysis of documents, for example, difference analysis using graph neural networks.

Description of Related Art

Text-based documents, such as books, articles, legal documents, forms, social posts, and the like, are often changed (e.g., revised, edited, and updated) for any number of reasons. Sometimes changes may be minor, for example, correction of a typo. Other times, changes may be major, for example, changing a clause in a contract or a term in the tax code.

In some cases, a change may be readily determined. For example, often a news article with a correction will contain a post-script identifying the change. In other cases, however, a change may not be highlighted. For example, a revised edition of a book may identify that the book has been changed, but does not specifically identify the changes.

Many text editing software programs allow for utilization of track changes to automatically redline or track these changes to a document, for example, as the changes are made. In some cases, a software program may run a comparison between two versions of a document and automatically redline or track changes from one version to the next.

These track changes and document compare tools have technical limitations, however. In particular, such systems find specific syntactic differences based on character- or word-level differences. For example, an edit to a document to correct "affect" to "effect" may only be a correction of a typo and not affect understanding of the content. However, an edit to a document to change a reference to "Section XX.IV" to "Section IV.XX" may change the content. For example, Section XX.IV references using a multiplier of 10×, while Section IV.XX references using a multiplier of 2×. Thus, although the change was a minor character-level change, similar to "affect" to "effect", the impact of the change is dramatic, e.g., the multiplier would result in an 8× difference.

Further, such tools do not identify a change in an ancillary reference because the tools focus on the syntactical differences of the different versions of the document itself. For example, a document may reference all the medical expenses listed in "Appendix B" as part of the document, but if the list of medical expenses in "Appendix B" changes, that will not be identified as a change to the document itself.

Other tools may identify a change in location and/or arrangement of content within a document. For example, some tools identify if a section of text is moved to a different location within the document, such as when the section of text is copied and pasted elsewhere. However, such re-arrangement within the document may affect the content and meaning of the document. For example, a reference to Section 3, when the document was re-ordered to have old Section 4 now after Section 2 (and thus new Section 3) changes the meaning of the reference to Section 3, as now being new Section 3 (old Section 4).

Accordingly, there is a need for improved systems and methods for determining content and context of differences between various documents.

SUMMARY

One aspect provides a method of identifying content differences between two or more documents, comprising: embedding a set of source documents into a knowledge graph, wherein each source document is embedded in the knowledge graph as a set of segments and a set of associations, wherein each association connects two or more segments of the set of segments; determining a difference between a first segment in the set of segments of a first source document and a second segment in the set of segments of a second source document; in response to determining the difference between the first segment in the set of segments of the first source document and the second segment in the set of segments of the second source document, determining a significance of the difference on the second source document based on one or more associations of the set of associations connected to the second segment; and updating at least one follow-on procedure based on the significance of the difference on the second source document.

Another aspect provides a method of identifying content differences between two or more documents, comprising: embedding a set of source documents into a knowledge graph, wherein each source document is embedded in the knowledge graph as a set of segments and a set of associations, wherein each association connects two or more segments of the set of segments; determining a difference between a first segment in the set of segments of a first source document and a second segment in the set of segments of a second source document, comprising: assigning a link prediction between a pair of segments in the knowledge graph with a graph neural network, wherein: the pair of segments comprises the first segment in the set of segments of the first source document and the second segment in the set of segments of the second source document, and the link prediction indicates the difference between the pair of segments; in response to determining the difference between the first segment in the set of segments of the first source document and the second segment in the set of segments of the second source document, determining a significance of the difference on the second source document based on one or more associations of the set of associations connected to the second segment; and updating at least one follow-on procedure based on the significance of the difference on the second source document.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 8 depicts an example method for difference analysis between source documents.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
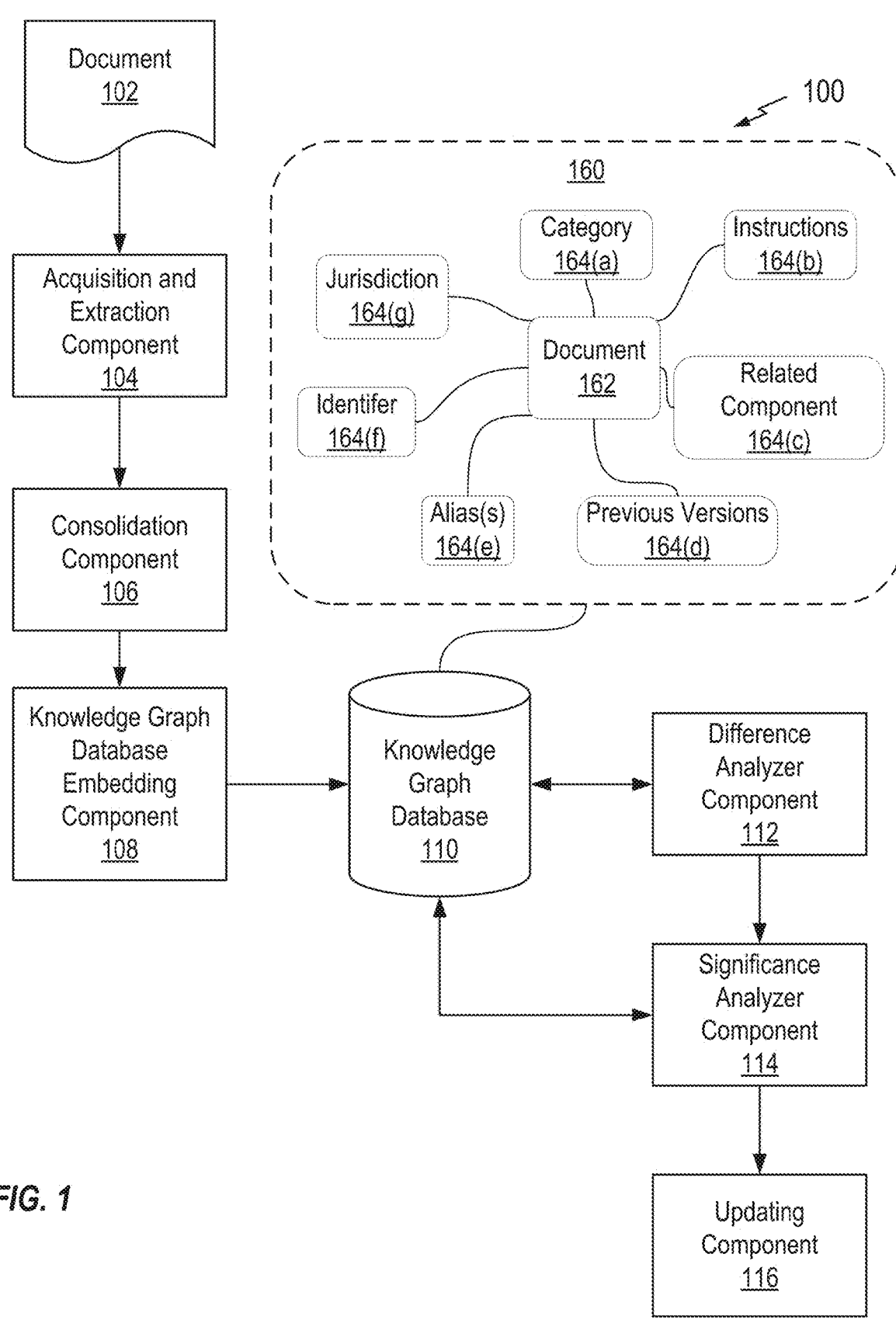
FIG. 1 depicts an example system for difference analysis.

Aspects of the present disclosure provide apparatuses, methods, processing systems, and computer-readable mediums for difference analysis of documents, including determining a difference between versions of documents and determining a significance of the determined difference.

Documents may include any written, printed, or electronic matter providing information, for example, records, forms, instructions, legal code, software code, data sets, tables, spreadsheets, receipts, invoices, transcriptions, and the like. Additionally, documents may include various media such as videos, sound or voice recordings, and photographs. Further, documents may include a variety of electronic document types, including, for example, DOCX, PPTX, PDF, etc.

As described above, there are various tools for determining character-level changes, word-level changes, and layout changes. For example, conventional redlining tools may use an exact text match to find character-level differences or formatting differences. Character-level changes may often be trivial, that is, the changes may be minor and not otherwise affect the content. Examples of trivial changes include minor formatting changes, fixing typos, punctuation, and the like, and correcting spelling. However, some character-level changes may be significant. Examples of significant changes may include where a change to a single character or several characters changes the meaning and information of the content. Consider the example in which a tax form from one year to the next changes a single character: a tax rate from 3% to 8%. That one character change is very significant. By contrast, the tax form may also change a single character in the form from 2023 to 2024, which would not be a significant change. Thus, while identifying character-level changes may be straightforward, determining the significance of the change and related downstream effects of the change is beyond the capability of conventional tools and therefore a technical problem.

Moreover, the location and arrangement of content within a document often conveys meaning and context to the content. For example, headings, sections, graphic content, ordered arrangements, and the like may provide context to content located therein. Changes in location and arrangement may thus change the context and meaning of the content, even where the content itself has not changed. For example, where a person's name is labeled under a "partner" section heading in a second version of a business information document, as opposed to an "owner" section heading of a first version of the business information document, the meaning of the person's position has changed from "owner" to "partner" in the second version.

Additionally, conventional tools may not be able to identify and/or determine changes to the content itself. For example, the sentence "The theory of relativity links time and space on a single continuum called space-time." revised to read "The theory of relativity connects time and space into one continuous fabric known as space-time." does not change the information and meaning conveyed, that is, information about Albert Einstein's theory of relativity. However, a character-level change identification tool would highlight the character-level differences, for example, "The theory of relativity [strikethrough] links [underline] connects time and space [strikethrough] on a single continuum called [underline] into one continuous fabric known as space-time." Identification of such a change may be trivial because the change is not significant to the information and meaning conveyed by the document. Furthermore, layout changes, especially in complex or lengthy documents, may obfuscate content changes.

Further, in some cases, an effective change in a document (or an interpretation of content in the document) may be based on an ancillary document. For example, a document may reference an appendix that provides a changed definition to a term that has not changed (textually) in the referencing document. Thus, while the text of the referencing document is the same, its meaning has changed, potentially in significant ways.

Accordingly, there exists a technical problem in conventional document comparison tools that identify character-level, word-level, and layout changes in documents in that they do not identify all changes (e.g., changes by reference to another document) or the significance of changes, such as on a downstream process.

Aspects of the present disclosure provide technical solutions for identifying changes between two or more documents and significances of those changes. Certain aspects provide for ingestion of documents into a knowledge graph database, whereby relationships between the content, including between each document itself, and other corpus documents, are modelled. Further, in certain aspects, differences between a document and other documents, for example, between versions of the same document or similar documents may be determined based on the relationships modelled in the knowledge graph database. Then, in certain aspects, a significance of a difference may be determined. For example, a change to a document from a prior version may be determined as a difference between the two versions, as well as the significance of the difference between the two versions may be determined. In some aspects, a significant difference may be defined in part by one or more repercussions associated with the difference, for example, a change in legal, financial, tax, or other status. A significance may be a consequence of the difference, including indirect consequences. Advantageously, both a change to a document and the significance of the change may be determined.

As used herein, a difference comprises a variation or distinguishing element between two documents. In some aspects, a difference may include a syntactic difference, for example, a text or numerical character-level difference, e.g., "2023" to "2024". In some aspects, a difference may additionally or alternatively include a semantic difference, for example, a meaning or interpretation difference based on a word-level difference e.g., "pair" to "pare". In some cases, a difference may include a variation comprising additional or fewer elements, for example, an addition or deletion of one or more characters, words, sentences, sections, and the like. In some aspects, a difference may be a sentence-level difference, for example, a variation between a first sentence in a first document and a second sentence in a second document. A sentence-level difference may include one or more word-level differences, which, when combined in a sentence convey a different meaning or interpretation.

In some aspects, a difference may be an arrangement difference, for example, a difference in location of an element between two documents, even if the element itself remains the same between the two documents. For example, an image may be located in the top third of a first page of a first document, and the same image may be located in the bottom third of a first page of a second document.

In some aspects, a difference may be a formatting difference, for example, a change in formatting of an element or text between two documents, such as bolding, italicizing, underlining, highlighting, and the like. For example, a portion of text may comprise the same text between two documents, but in the first document the text is regular font and in the second document the text is italicized. As another example, a portion of text may also change as well as a change in formatting, such as adding a bolded and underlined section heading to a second version of a document.

In some aspects, a difference is determined based on a prediction that a segment of a first document and a segment of a second document are similar, but not the same. In some aspects, a difference is determined based on a prediction that a segment of a first document and a segment of a second document are neither similar nor the same. In some aspects, a prediction that two segments are the same, similar, or neither is made using link prediction, for example, using a GNN to perform link prediction.

As used herein, a significance of a difference refers to the impact or relevance of the difference, especially in light of the document containing the difference. In some aspects, a significance may include an effect of the difference on the content itself, for example, a change in the meaning or interpretation of the content. In some aspects, a significance of a difference may be defined, at least in part, based on one or more repercussions of the difference. For example, a repercussion may include an effect of the difference on another component of the document, such as, a change in the meaning or interpretation of another section in light of the difference. In some aspects, a repercussion may include an effect of the difference on another document, for example, a change in the meaning or interpretation of another document in light of the difference. Accordingly, a significant difference may impact content, meaning or interpretation of the content, and one or more actions taken in accordance with the content.

A significant difference may, in some aspects, affect other systems, people, and/or actions, such as follow-on processes, decisions, and behavior. In some aspects, a significance of a difference may be based on a risk analysis, for example, an identification of a risk associated with the difference.

As an example within a tax domain, new documents, and new versions of documents are often released year over year. For example, one or more documents in a form set, e.g., a set of related forms and instructions, may have a change. One common change is a change in the year, e.g., 2023 to 2024. This change is expected and does not represent a change in the content of the document. The change in the year of the documents may be determined to be a difference between the versions of the document. However, the difference may be determined to not be a significant difference, that is, there is no or low significance of the difference on the document.

Sometimes a change may be a different layout or on a different document in the form set. This change may not be a change in the content of the form set. However, for a system configured to enter information into a form in the form set, a change in layout may require the system to change where the information is entered. The content to be entered and how to determine what to enter may not change. Thus, a change in layout may be determined to be a difference between the versions of the document. Further, the difference may be determined to be a significant difference, that is, there is a significance of the difference on the document because the information is now in a different location.

Another change may occur where the form for entering information has not changed, but the instructions (often located on a different page or in a different document) have changed, such that the information to be entered has changed. A difference may be determined because the instructions contain different content and different information is to be entered. Further, the difference may be determined to be significant because the effect of the difference is that different information is to be entered into the form.

Aspects described herein enable determination of all differences between documents. In some aspects, content is categorized as the same, similar, or different between the versions of the document, even where the change is not readily evident, such as a change to an instruction on a different document or page. Similar and different content may be determined to be a difference. Some similar differences may not be determined to be significant, for example, the change from tax year. However, a difference in a tax rate, e.g., 20% to 21%, although similar, may be determined to be significant. Further, different content, such as additions and/or deletions may be determined to be significant. Determining significance of a difference may indicate and differentiate between a difference which does not affect other content, such as a tax year, and a difference which does affect other content, such as a tax rate. Furthermore, aspects described herein enable updating other systems and procedures based on significant differences, for the tax rate example, updating a component configured to apply a tax rate to the new rate.

Accordingly, many technical benefits may be derived from the aspects described in the present disclosure. For example, by using a knowledge graph and link prediction to determine the differences at subcomponent level, a variety of types of differences may be determined. In particular, differences including both syntactic word or sentence changes, as well as semantic differences including content changes may be determined. Moreover, aspects enable determining ancillary differences based on associations between related, but different pieces of content across documents through the knowledge graph. Beneficially, then an increased number and type of differences may be determined.

As another example, aspects described herein determine a significance of the determined differences, including by using the associations embedded in the knowledge graph. Determining significance enables determining which differences may affect other components or processes, or otherwise impact the content of the document. Further, differences that are low significance, for example, trivial changes such as corrections of typos, formatting, and the like, may be separated such that no follow-on processes or components need to be updated. Thus, further processing can be avoided for these insignificant differences.

Further, determined significant differences may be used to facilitate updates to other components and processes affected by the difference. For example, based on a determined significant difference, a follow-on process may be automatically updated where a difference will impact that process. As an example, a difference may be a difference in a tax rate, e.g., 3% to 8%, between versions of a document. The difference in the tax rate may be significant because the tax rate indicates a change in legal status, and affects the tax paid by a person subject to the increased tax. Thus, a system configured to estimate a tax to be paid may be updated to utilize the changed tax rate of 8%. Thereby, the system may be readily, and even automatically, updated based on determining a significant difference.

Furthermore, in certain aspects, a significant difference may affect other documents, content, and processes. Thus, aspects described herein enable updating processes directly and indirectly affected by a significant difference. For example, in the tax rate change example, not only the system estimating tax to be paid, but also a system estimating pay period withholding may be updated. This enables rapid implementation of content changes, and may be effectuated to a large number of processes and components.

Example Document Comparison System

FIG. 1 depicts an example system 100 for determining comparing document of documents. In particular, the example system 100 is configured to process various documents to determine one or more differences between documents and to determine a significance of the one or more differences. Example system 100 is configured to utilize an acquisition and extraction component 104 to acquire and process each document 102, consolidate extractions with a consolidation component 106, and embed the extracted and consolidated components into a knowledge graph database 110 with a knowledge graph database embedding component 108. Then, example system 100 is configured to utilize a difference analyzer component 112 to determine difference (s) using the knowledge graph database 110 and utilize a significance analyzer component 114 to determine significance(s) of the differences determined by the difference analyzer component 112. Then, updating component 116 is configured to update various other components and methods based on the differences and significances determined.

A knowledge graph is a structured representation of knowledge that captures and organizes information about segments of information and the associations between the segments. A knowledge graph uses graph theory to model this information by embedding components of information as entities, (e.g., nodes), and associations as edges to form an interconnected network of information. The model facilitates querying and reasoning about the knowledge captured.

Each entity may also include one or more attributes, which are characteristics or details about the entity. There may be different types of entities embedded in the graph. There also may be different types of edges embedded in the graph. A knowledge graph may also have an ontology, often called a schema, which defines the types of entities and edges that may be used, as well as rules and constraints for interactions between entities and edges. The ontology may focus on a specific domain or area of knowledge, providing detailed and specialized concepts, as well as relationships about the knowledge contained within the knowledge graph.

Document 102 represents any document to be processed. In some cases, two or more documents may be processed, iteratively or sequentially. In some cases, the two or more documents may comprise different versions or editions of the same document, for example, a 2023 version and a 2024 version, or a first edition and a second edition. In some cases, a document may be part of a set of documents, for example a set of related or similar documents. A set of documents may include a set of forms, for example, related tax forms and associated instructions.

A document is a structured piece of content, often recorded in written form that provides evidence, communicates information, and/or serves as a record. Documents can take various formats, for example, text-based documents, legal documents, digital documents, and historical documents. Text-based documents may include written pieces like reports, essays, letters, memos, contracts, books, forms, code repositories, back-end code, front-end code, forms, and the like. Text-based documents may be physical or electronic, for example DOCX, PPTX, PDF, and the like. Legal documents may include formal records with legal significance, such as contracts, wills, deeds, regulations and legislation, forms, and the like. Digital documents may include electronic files including text, images, multimedia, websites, social media, applications, and other interactive documents, such as word processors, spreadsheets, slide decks, etc. Text-based documents may also be digital documents. Historical documents may include original records from the past, such as manuscripts, official records, or historical correspondence.

Content of a document may refer to the information, ideas, and elements contained within a document. This may include the ideas, information, themes, and meaning present in the document based on the elements of the document, including text, layout such as headings and subheadings, data and figures, images and other multimedia, references and citations, annotations and comments, and formatting of the document. Together these elements convey the document's information and meaning.

A document may be decomposed into a set of chunks. A chunk refers to a contiguous, non-overlapping block of text that is identified and processed as a unit. Chunking is a technique used to break down text into meaningful, manageable pieces, which can then be analyzed or extracted for further use. For example, a chunk may comprise one or more elements, for example, a section of a document, a heading and/or subheading, a data table, a data figure, an image or graphic, a reference or citation section, an annotation or comments section, and the like. The set of chunks comprising the document may be ordered. In some aspects, one chunk may be associated with another based on the order of the chunks in the document. Further, in some aspects, each chunk may be associated with the document from which it was extracted.

In some aspects, a chunk may comprise one or more subcomponents, called segments. A segment may comprise one or more words, fields, labels, or headers. For example, a data table chunk may comprise multiple segments, such as individual table cells, table rows, or table columns. As another example, segments for a chunk of text may comprise sentences of the chunk of text. Together, a chunk and a segment may have a hierarchical parent-child relationship, where the segment is a child of the chunk. Further, multiple segments of a chunk may be ordered, for example, a first segment may be associated with a second segment based on the order of the segments in the document.

Acquisition and extraction component 104 is configured to acquire and process the document 102 into chunks and segments for embedding into the knowledge graph database 110. Various extraction techniques may be utilized to extract content from the document 102. For example, and as described further herein with respect to FIGS. 2A-2D, extraction techniques may include computer vision extraction, or large language model (LLM)-based extraction.

Consolidation component 106 is configured to consolidate the chunks and segments extracted by the acquisition and extraction component 104 before embedding by the knowledge graph database embedding component 108. Consolidation is described further with respect to FIG. 2E.

Figure 3A:
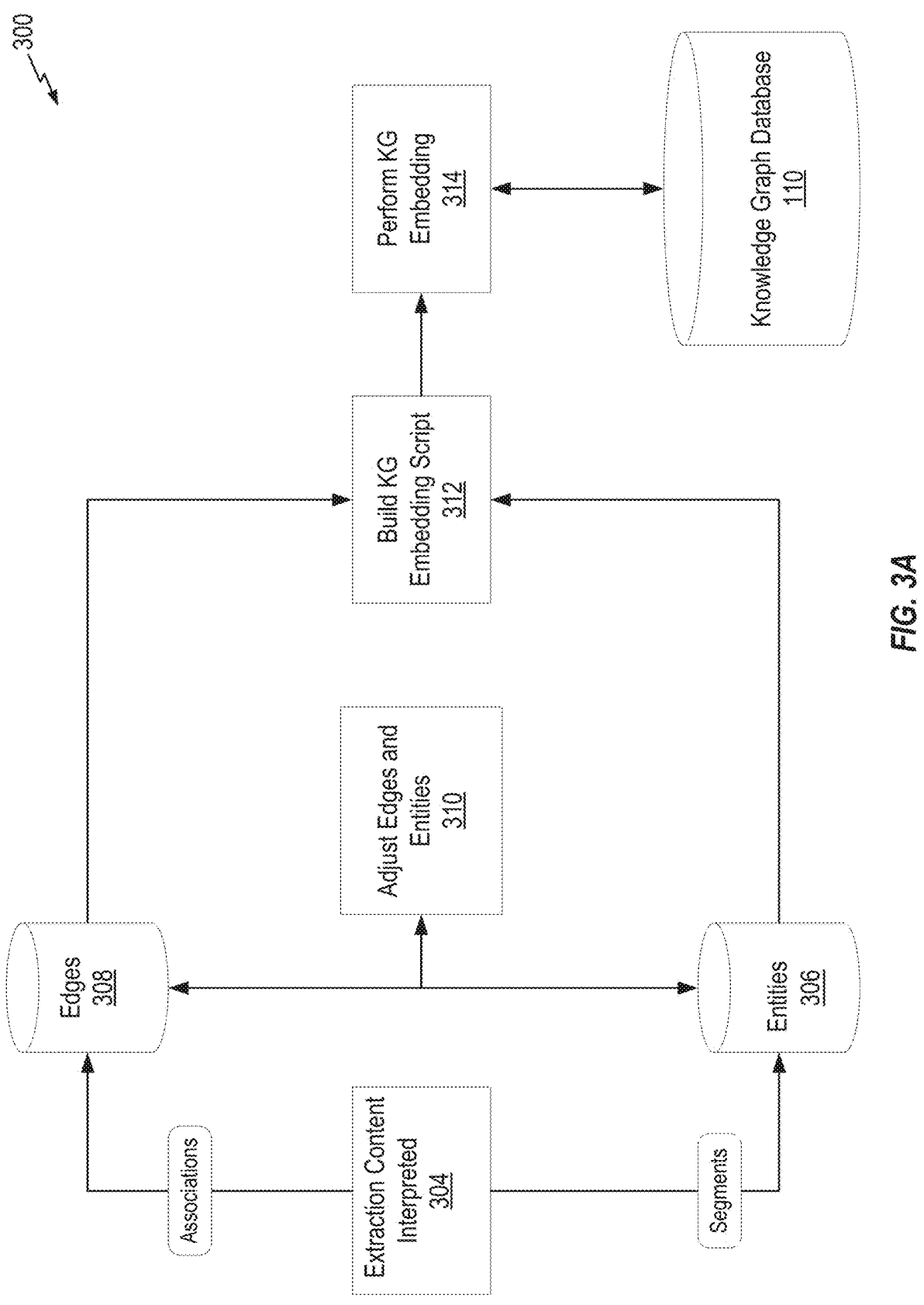
FIG. 3A depicts an example method for generating a knowledge graph based on extracted text from source documents.

Knowledge graph database embedding component 108 is configured to embed the extracted segments into the knowledge graph database 110. FIG. 3A depicts an example method for embedding the extracted segments into the knowledge graph database 110.

Example embedding 160 depicts an example embedding of the document 102 embedded into the knowledge graph database 110. In particular, the extracted chunks and segments of the document 102 are embedded as entities within the knowledge graph database 110. In this example, a document entity 162 represents the document 102. Additionally, other entities 164 representing related chunks and segments of the document 102 are also embedded, in this example, a category entity 164(*a*), an instructions entity 164(*b*), a related component entity 164(*c*), a previous versions entity 164(*d*), an alias entity 164(*c*), an identifier entity 164(*f*), and a jurisdiction entity 164(*g*). The association between the document 102 and each of these chunks or segments is embedded as an edge connecting the document entity 162 to each of the other entities 164.

Difference analyzer component 112 is configured to determine the differences between documents (or between sets of documents) using the knowledge graph database 110. In some aspects, the difference analyzer component 112 is configured to utilize link prediction to determine one or more differences between segments of each document. Link prediction is a network analysis task in which the goal is to predict the existence of a link between different nodes of a graph based on the structure of the graph. One method of link prediction utilizes graph neural networks (GNNs) in which a model is trained to learn between pairs of nodes in a graph, whether an edge or association should exist. A GNN is type of neural network; however, a GNN processes data structured in a graph. Specifically, a GNN processes data embedded as nodes interconnected by edges. GNNs are particularly useful for handling complex, non-Euclidean data where traditional neural networks might not be as effective.

In some aspects, links between segments (embedded into the knowledge graph database 110 as an entity, e.g., document entity 162) of the first document (or first set of documents) and segments of the second document (or second set of documents) are predicted, for example, using a GNN to perform link prediction. In some aspects, a link between a first segment and a second segment may be a same link or a similar link. A same link may be determined where two segments have the same meaning and information. A similar link may be determined where two segments have similar meaning and information. A link may be determined based on a keyword match, a semantic match, and a contextual match based on the structure of the knowledge graph database 110.

In some aspects, a similar link may indicate a difference. Further, segments that are not linked by a same link or a similar link may, in some aspects, represent a difference, for example, an addition or deletion of the segment.

Significance analyzer component 114 is configured to determine a significance of the difference(s) determined by the difference analyzer component 112. In some aspects, a significance of a difference may be determined by extracting a segment associated with the difference, and one or more associations with the segment based on edges connecting the entity(ies) associated with the difference to determine a number, type, or attribute of a segment determined to be different.

For example, a first entity of the knowledge graph database 110 associated with a first document is not predicted to be linked to any entity of a second document in the knowledge graph database 110. The difference analyzer component 112 determines the first entity to be a difference, e.g., a deletion in the second document. Then, significance analyzer component 114 is configured to extract the first entity representing a first segment of the first document and the associations embedded as edges connecting the first entity to other entities within the knowledge graph database 110. The deletion difference may be cataloged. In some cases, the associations and other entities connected to the entities may also be cataloged with the difference.

As another example, a first entity of the knowledge graph database 110 associated with a first document is predicted to be similar to a second entity of the knowledge graph database 110 associated with a second document. The difference analyzer component 112 determines there to be a difference between the first entity and the second entity, for example, a syntactic change between the first entity and the second entity. Then, significance analyzer component 114 is configured to extract the first entity and the second entity, and the edges connecting each of the first entity and the second entity with other entities within the knowledge graph database 110. The syntactic difference may be cataloged.

Accordingly, by using a knowledge graph and link prediction to determine the differences at a subcomponent (e.g., segment) level, a variety of types of differences may beneficially be determined. In particular, differences including both syntactic word or sentence changes, as well as semantic differences including content changes may be determined. Moreover, aspects enable determining ancillary differences based on associations between related, but different pieces of content across documents. Beneficially, then an increased number and type of differences may be determined.

Then, in some aspects, a difference may be assigned an impact score. An impact score may be based on various criteria, for example, criteria associated with the attributes of the segment, criteria associated with the domain, criteria associated with follow-on components and/or processes, and the like. For an example tax domain, one criterion may be that differences associated with monetary values may have a higher impact score. In one example, a deduction amount may have increased between a first version of a tax instruction form and a second version. The difference in deduction amount has a substantial impact on tax refunds with the deduction. Thus, the difference may have a higher impact score based on the monetary value criteria.

In some aspects, an impact score may be determined based on the number and/or type of associations, and/or the number and/or type of associated entities, with the entity with the difference. For example, a difference entity associated with a high number of associated entities may have a high impact score. In an example tax domain, the available values to fill a field in a form change between a first version of a document and a second version of the document, such as a "gender" field. There may be several references to the gender entity within the form set, and thus, associated entities. The entity containing the increased number of values may have a high impact score based on the several references to the field. As another example, a difference entity with a high number of child associations may have a high impact score. Yet another example, a difference entity with a low number of associations may have a low impact score.

In some aspects, differences may be ranked based on the impact score.

In some aspects, a significance may be determined based on an impact score satisfying a threshold. In some aspects, a difference may be determined to be insignificant or have low significance where the impact score of the difference does not satisfy the threshold.

In some aspects, the LLM may be trained to determine a repercussion of the significant difference based on the content of the segment with a difference, for example, using impact analysis to evaluate direct and indirect repercussions of the difference. For example, a deletion difference that removes a section of text from a form document may be processed by an LLM to determine the content deleted from the form document and one or more effects of the deleted content on the rest of the form, and/or related forms.

Figure 6:
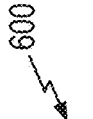
FIG. 6 depicts an example method for determining differences and significance of the differences between source documents using a knowledge graph.

FIG. 6, described further below, depicts an example method for determining the differences and significances between documents using the knowledge graph database 110.

Beneficially, determining significance of a difference enables determining which differences may affect other components or processes, or otherwise impact the content of the document. Further, differences that are not significant or have low significance (e.g., an impact score below a threshold), for example, trivial changes such as corrections of typos, formatting, and the like, may be separated and not acted upon.

Updating component 116 is configured to update various other components and methods based on the differences and significances determined. For example, a deletion may be a field on a form. The significance indicates that subsequent fields no longer rely on the deleted field. A service configured to populate a subsequent field based on the deleted field is updated to remove the field from the service and remove the population of the subsequent field based on the deletion and the significance.

Accordingly, rapid implementation of content changes may be achieved, and the changes may be effectuated to a large number of processes and components through updating component 116 automatically.

Example Extraction Methods

FIGS. 2A-2D depict various example methods for extraction of content from a document, for example, document 102 in FIG. 1. In some aspects, the acquisition and extraction component 104 in FIG. 1 is configured to extract content from a document 102 based on one or more extraction methods depicted in FIGS. 2A-2D. The content is extracted, as text, including structured text, such as tables and fields, as well as other elements, including graphics, headers, sections, and the like, to form chunks and segments for embedding into the knowledge graph database 110. Further, in some aspects, extraction methods described herein enable extraction of associations between chunks and segments of extracted text.

Figure 2A:
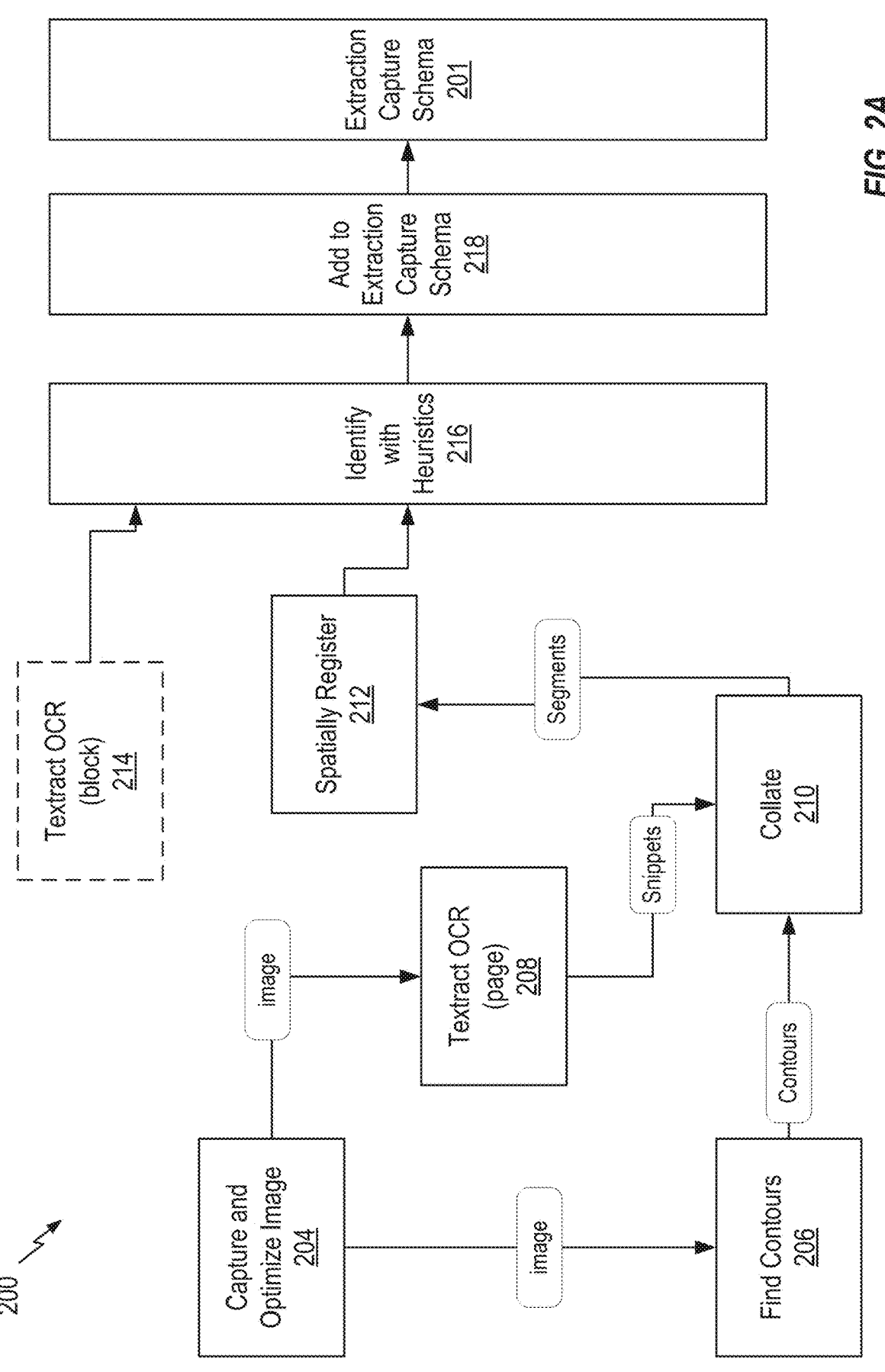
FIGS. 2A-2D depict various example methods for extracting text from source documents.

In particular, FIG. 2A depicts an example method 200 for using computer vision to extract text content from images and/or video. Initially, at block 204, an image (which may be, in some examples, an individual frame from a video) is captured and optimized. In this case, an image depicts a document, for example, a document captured by a camera, scanner, or other imaging device. In certain aspects, optimization of an image may include preprocessing to enhance quality, normalize lighting conditions, or reduce noise. This can include resizing, cropping, color correction, and other techniques. The image may be in various formats, for example, JPEG, PNG, or PDF.

At block 206, the image is processed to find contours. Contours are the curves that represent boundaries of objects or regions of interest within an image. Contours may be detected through image thresholding and edge detection. Contours provide information about the structure and extent of objects depicted within an image, and can be represented, analyzed, and approximated to facilitate various computer vision tasks.

At block 208, optical character recognition (OCR) is used to extract text from the image of the document based on each page of the document. OCR involves scanning an image representing a document, executing text recognition to identify text within the document, and converting the document 102 into machine-readable text. OCR includes image preprocessing, text detection, character recognition, and postprocessing. OCR is widely used for document digitization, data entry automation, and text extraction, and it addresses various challenges related to text quality and document complexity. In some aspects, OCR may recognize and extract from forms, including field names and values as key-value pairs. In some aspects, OCR may recognize tables of data, including cell values and table structure. OCR may output snippets of extracted text from the image of the document.

In some aspects, at block 208, OCR performs page-based extraction in which the entire page of the document represented in the image is processed. This allows for extraction of the entire contents of the page, as well as the layout of the contents. Thus, an output of a page-based extraction includes the location and layout of the content of the page. Thus, page-based extraction is useful when the layout of a document (e.g., forms) is important.

At block 210, the contours identified at block 206 and the extracted text from block 208 are collated to form segments. Segments may comprise subcomponents of the document, for example, words, sentences, fields and values, labels, headings, and the like detected in the document. Together, the contours and the extracted text may be sorted and arranged to form the segments.

At block 212, the segments from block 210 are spatially registered. Spatial registration involves aligning and matching image data to a common coordinate system or reference frame so that the corresponding features across the images will accurately match. In some cases, spatial registration may include geometric transformation of an image. In some cases, spatial registration may include feature detection and matching between different images.

At block 214, a block-based OCR is performed to extract text from the document based on blocks of content. A "block" refers to a distinct segment of information detected within a document. These blocks can be text, tables, forms, or other structural elements. Blocks help organize and categorize different types of data, allowing for more precise extraction and understanding of the document's content. Block-based OCR enables preservation of the hierarchical structure of text, for example, to distinguish between paragraphs of text and tables of text. Block-based OCR is also useful for highly-structured data, including forms and tables.

At block 216, a series of heuristics are used to identify the spatially registered segments. The set of heuristics may include deterministic (e.g., rule-based) approaches for identifying the segments, for example, text orientation, alignment, header and footer alignment, and the like, which may facilitate identification of detected segments.

At block 218, the segments are transformed and added to an extraction capture schema 201. For example, transformation may include cleansing, aggregation, filtering, enrichment, conversion, normalization, mapping, time-series transformations, or encoding and decoding.

An extraction capture schema is a structured framework or model used to define how information is extracted, organized, and represented from documents. This schema outlines the specific fields, formats, and rules for capturing data, ensuring consistency and accuracy during the extraction process. For example, a schema may define fields, formats, extraction rules, data validation, spatial registration, and the like, for extracted documents.

Figure 2B:
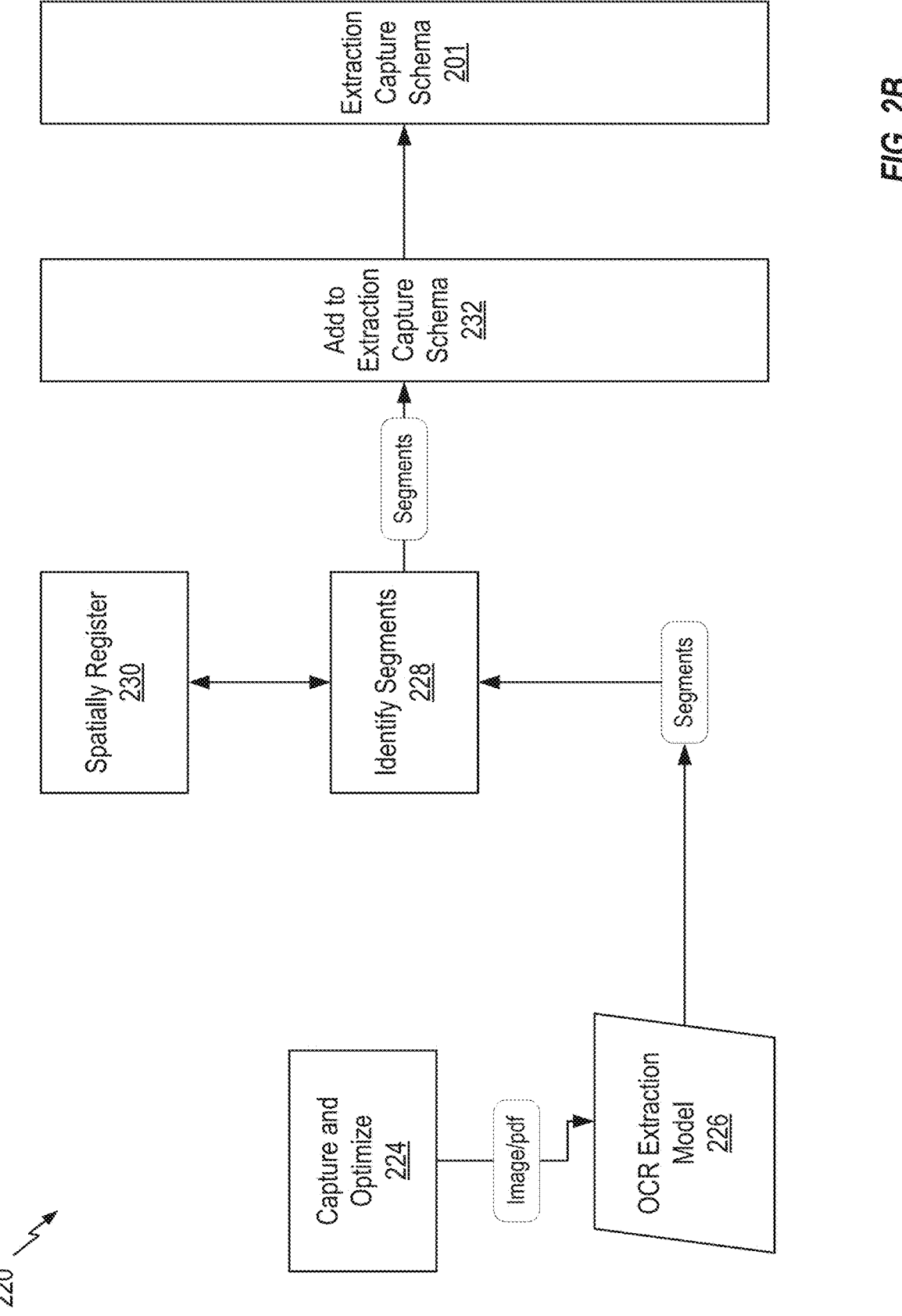

FIG. 2B depicts another example method 220 for computer vison to extract content from images and/or videos. Initially, at block 224, an image (which may be, in some examples, an individual frame from a video) is captured and optimized. Similar to block 204 in FIG. 2A, the image depicts a document, such as a document captured by a camera, scanner, or other imaging device.

At block 226, an extraction model is configured to extract text from an image using OCR. An extraction model may comprise a machine learning model trained to recognize and extract text from an image of a document. Example models may include convolutional neural networks (CNNs), recurrent neural networks (RNNs), transformers, and generative models.

At block 228, segments are identified from the extracted text, for example, words, sentences, fields and values, labels, headings, and the like detected in the document.

At block 230, the segments are spatially registered, such as described with respect to block 212 in FIG. 2A.

At block 232, the segments are transformed and added to the extraction capture schema 201, such as described with respect to block 218 in FIG. 2A.

OCR methods may be useful for highly structured data, for example, text-heavy documents, forms, data tables, and the like.

Figure 2C:
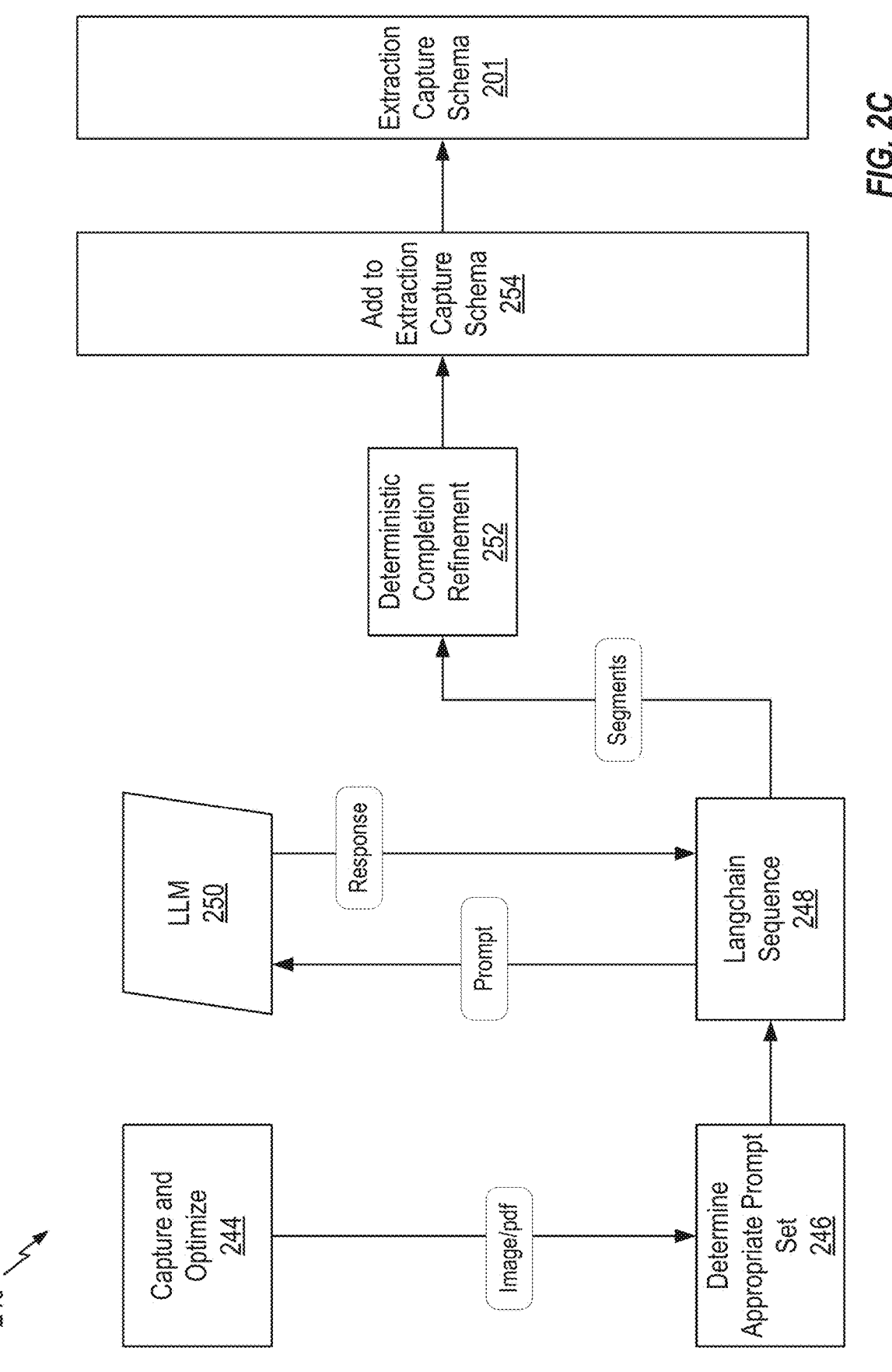

FIG. 2C depicts an example method 240 for extracting content using an LLM. Initially, at block 244, an image (which may be, in some examples, an individual frame from a video) is captured and optimized. Similar to block 204 in FIG. 2A, and block 224 in FIG. 2B, the image depicts a document, such as a document captured by a camera, scanner, or other imaging device. In some cases, method 240 begins at block 246 with an electronic document, for example, a PDF.

At block 246, a prompt set is determined. A prompt is a piece of text or a query provided to an LLM to elicit a response or generate output. Prompts guide the LLM in understanding what kind of information or action is needed, influencing how it processes and responds to the input. In some aspects, a prompt may instruct the LLM to extract the text from the document. In some aspects, a prompt may instruct the LLM to extract associations between the texts of the document. A prompt set may include one or more prompts for prompting the LLM.

At block 248, a langchain sequence is applied to the prompt set and the document and provided to the LLM 250 for processing. The LLM 250 is configured to generate a response comprising the extracted text. In some aspects, the LLM 250 may further analyze the extracted text, provide summaries, answer questions, or integrate additional information found in the document or through domain knowledge and return the results.

At block 252, the results are deterministically refined based on one or more rules. The results may be deterministically refined to identify segments of text extracted by the LLM 250, for example, to identify words, sentences, graphical features, and the like to form segments based on the one or more rules. In some cases, the results may be deterministically refined to identify associations between segments of text extracted by the LLM 250.

For example, the one or more rules may include validation rules to verify the format of the extracted text, normalization rules to standardize text formats, parsing rules to split, concatenate, or extract text, or transformation rules to convert units or values.

At block 254, the segments are transformed and added to an extraction capture schema 201, such as described with respect to block 218 in FIG. 2A.

LLM-based text extraction may be used for unstructured data, for example, free-form text. Additionally, LLM-based text extraction may also be useful for determining associations between text segments. Further, LLM-based text extraction may be used where there is little information for association of fields, because an LLM may identify patterns and make predictions where there is not enough information for other extraction methods.

Figure 2D:
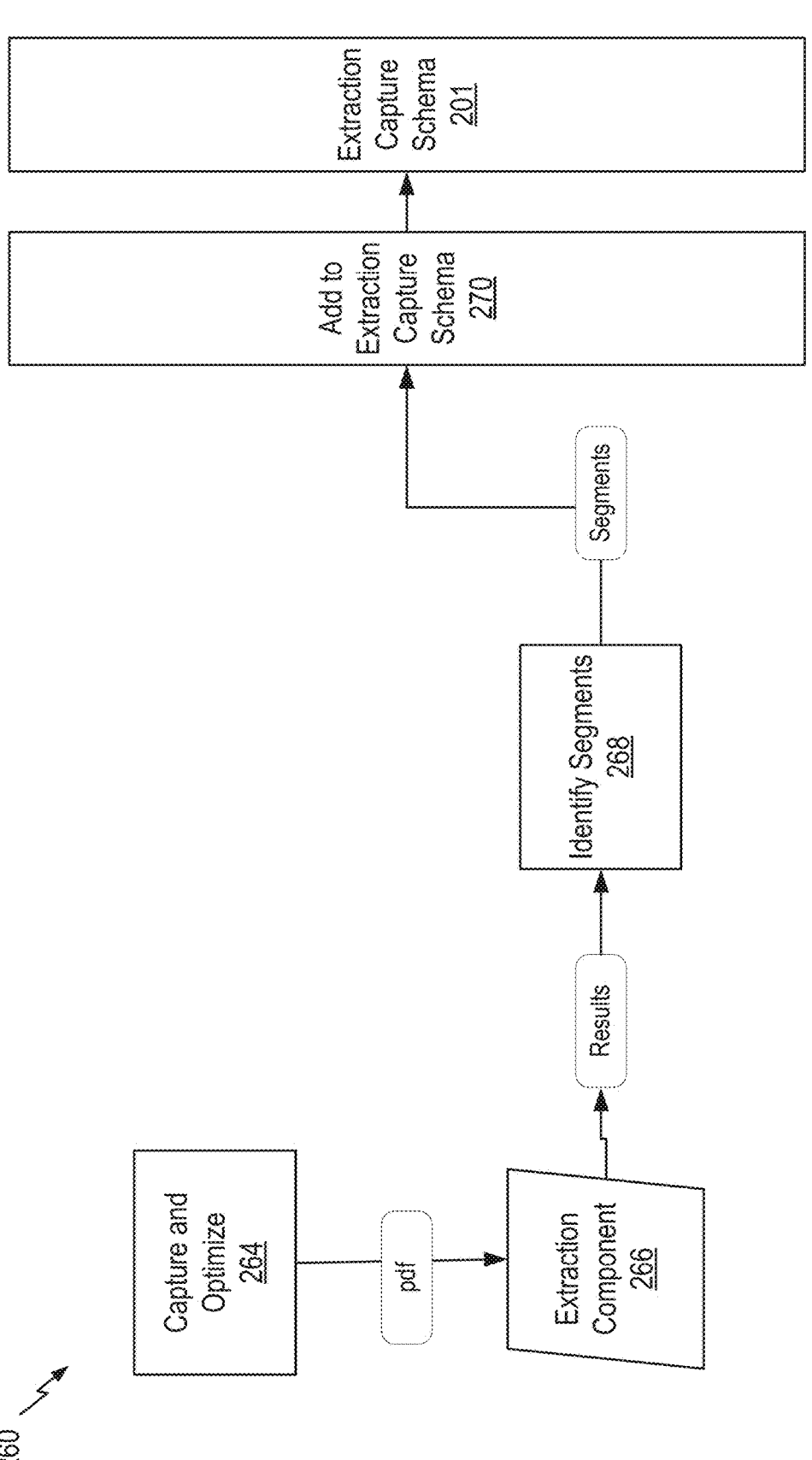

FIG. 2D depicts an example method 260 for extracting content from a PDF document or other electronic document. Initially, at block 264, a PDF document is captured and optimized. Similar to block 204 in FIG. 2A, block 224 in FIG. 2B, and block 244 in FIG. 2C, the PDF depicts a document, such as a document captured by a camera, scanner, or other imaging device. In some cases, method 240 begins at block 246 with an electronic document, for example, an XPS, EPUB, HTML document type.

At block 266, an extraction component is configured to extract one or more results from the document. In some aspects, the extraction component is configured to process a PDF document at a structural level, rendering pages to extract visual and textual content. Text is extracted from the document based on its positioning and structure in the document, rather than through a machine learning approach.

At block 268, one or more segments are identified amongst the results. The results may be processed to identify words, sentences, graphical features, and the like to form segments. In some cases, the results may be deterministically processed to identify segments based on rules for segmentation. In some cases, an LLM or other machine learning model may be used to identify segments from the machine-readable text extracted at block 266.

At block 270, the one or more segments are transformed and added to an extraction capture schema 201, such as described with respect to block 218 in FIG. 2A.

Figure 2E:
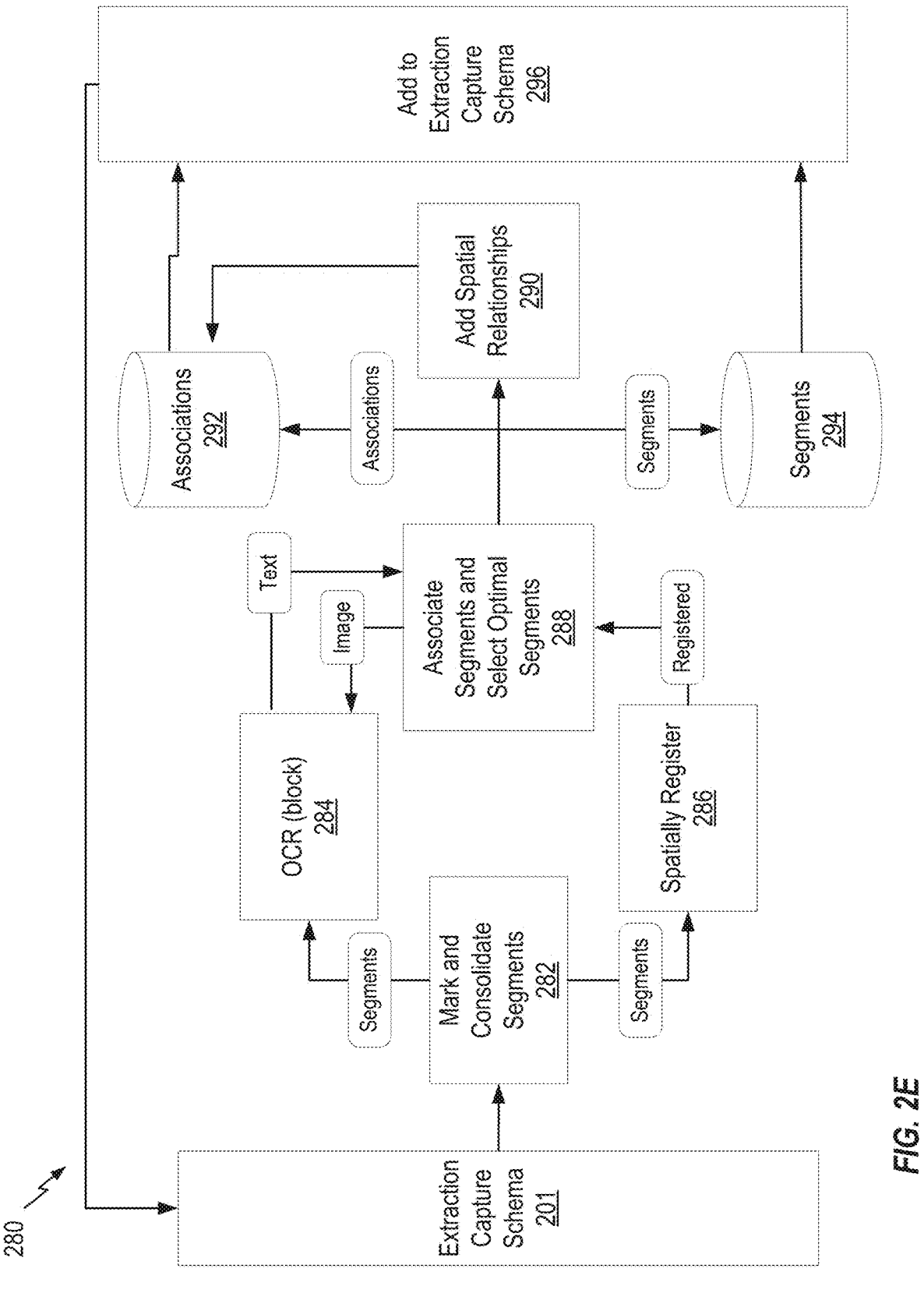
FIG. 2E depicts an example method for consolidating and aligning extracted text from source documents.

FIG. 2E depicts an example method 280 for consolidating extraction results, for example, by the consolidation component 106 in FIG. 1. Example method 280 is configured to consolidate the extraction results from one or more extraction methods, such as method 200, method 240, method 260, and/or method 280. In some aspects, additional or fewer extraction methods are used. For example, the same document may be processed through one or more of methods 200, 240, 260, and 280 to ensure all content is extracted from the document, as well as to improve the accuracy of extracted content. Moreover, different methods may have higher performance for extracting one type of element or another, for example, LLM-based extraction may be better at extracting unstructured text and computer vison extraction may be better at extracting structured text.

Initially, the extraction results from the extraction capture schema 201 are processed at block 282 to mark and consolidate the segments identify and combine segments from the various extraction methods into a single, coherent format before embedding into the knowledge graph database 110. In some embodiments, marking segments may involve identifying the segments within the document, for example, annotating or tagging segments. Further, marking segments may involve categorizing or labeling the segments for access and retrieval. Consolidation may involve unifying the marked segments into one format or document, including organizing, reducing redundancies, and ensuring consistency between segments.

For example, after a document is processed through both method 200 and method 260 to extract segments, a first segment identified through method 200 and a second segment extracted through method 260 may be the same segment of the document. The segments may be marked, for example, labeled as the same segment. Then the segments may be consolidated to ensure consistency between the extracted text forming the segments.

Optionally, at block 284, a block-based OCR is performed to extract text from the document based on blocks of content. Block-based OCR may be performed on the document where the one or more extraction methods did not previously involve block-based OCR. At block 286, the consolidated segments' spatial relationships are determined, captured, and added to the schema.

At block 288, segments are associated, that is, relationships between various segments are identified, including based on the spatial relationships determined at block 286. These associations 292 are added to the extraction capture schema at block 296. The segments 294 may also be added to the extraction capture schema at block 296. In some cases, associations may be made between segments of different pages of the document. In some cases, associations may be made between segments of different documents within a set of related documents.

At block 290, these associated segments may be transformed, for example, to remove duplicates, and then spatially registered with the schema.

Accordingly, content from documents may be extracted into chunks, segments, and associations which may be embedded into a knowledge graph, such as knowledge graph database 110 for difference analysis. By extracting content into various components, including subcomponents called segments, even minute differences may be determined. Furthermore, associations between the content, including sequential, hierarchical, and referential associations, may be extracted for embedding into the knowledge graph to enable a comprehensive and contextual view of the components and subcomponents when analyzing differences.

Note that FIGS. 2A-2E depict various examples of extraction and consolidation methods, and other methods, including fewer, additional, or alternative operations are possible consistent with this disclosure.

Example Knowledge Graph Database

Figure 3B:
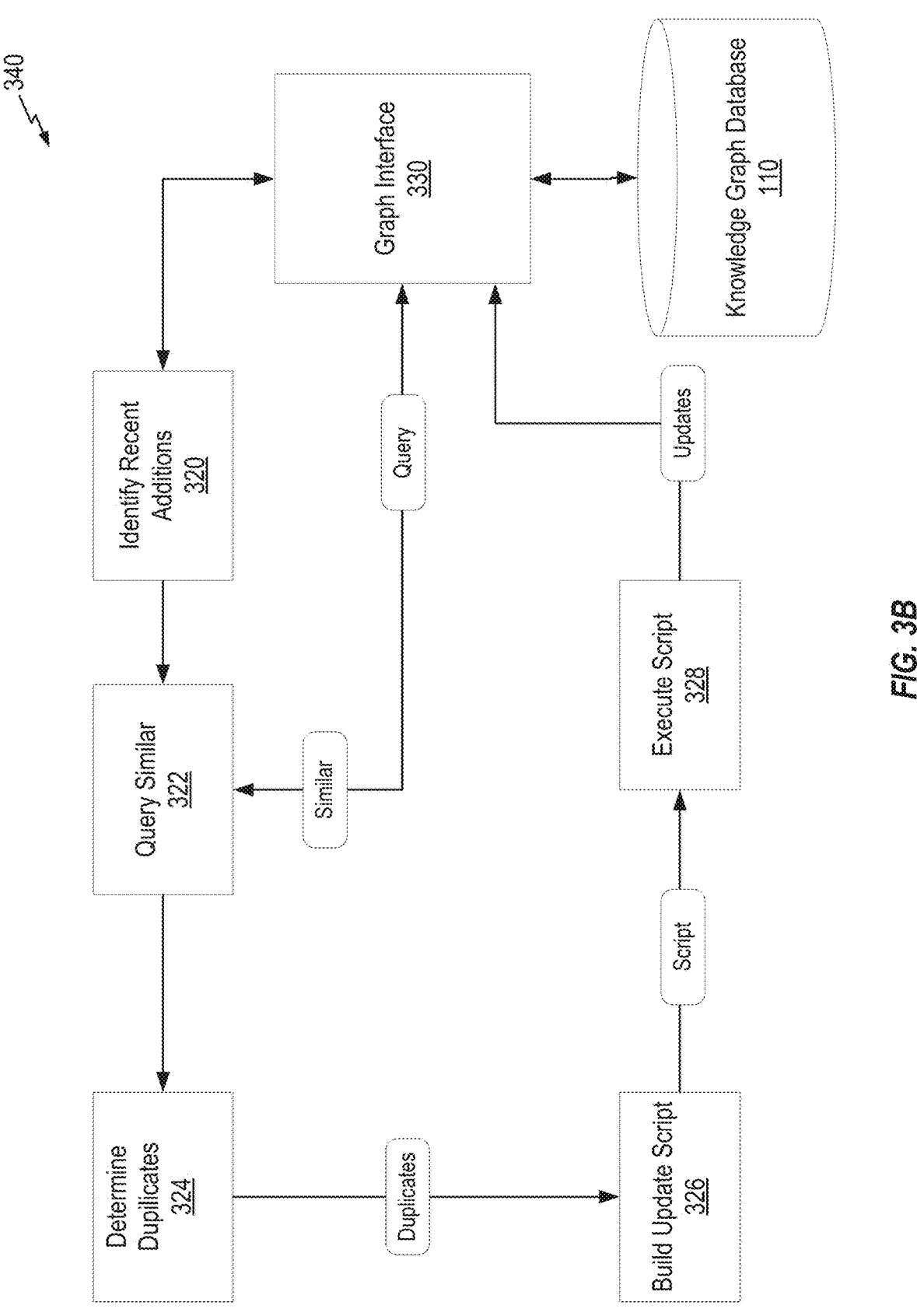
FIG. 3B depicts an example method for eliminating duplicates in a knowledge graph.
Figure 3C:
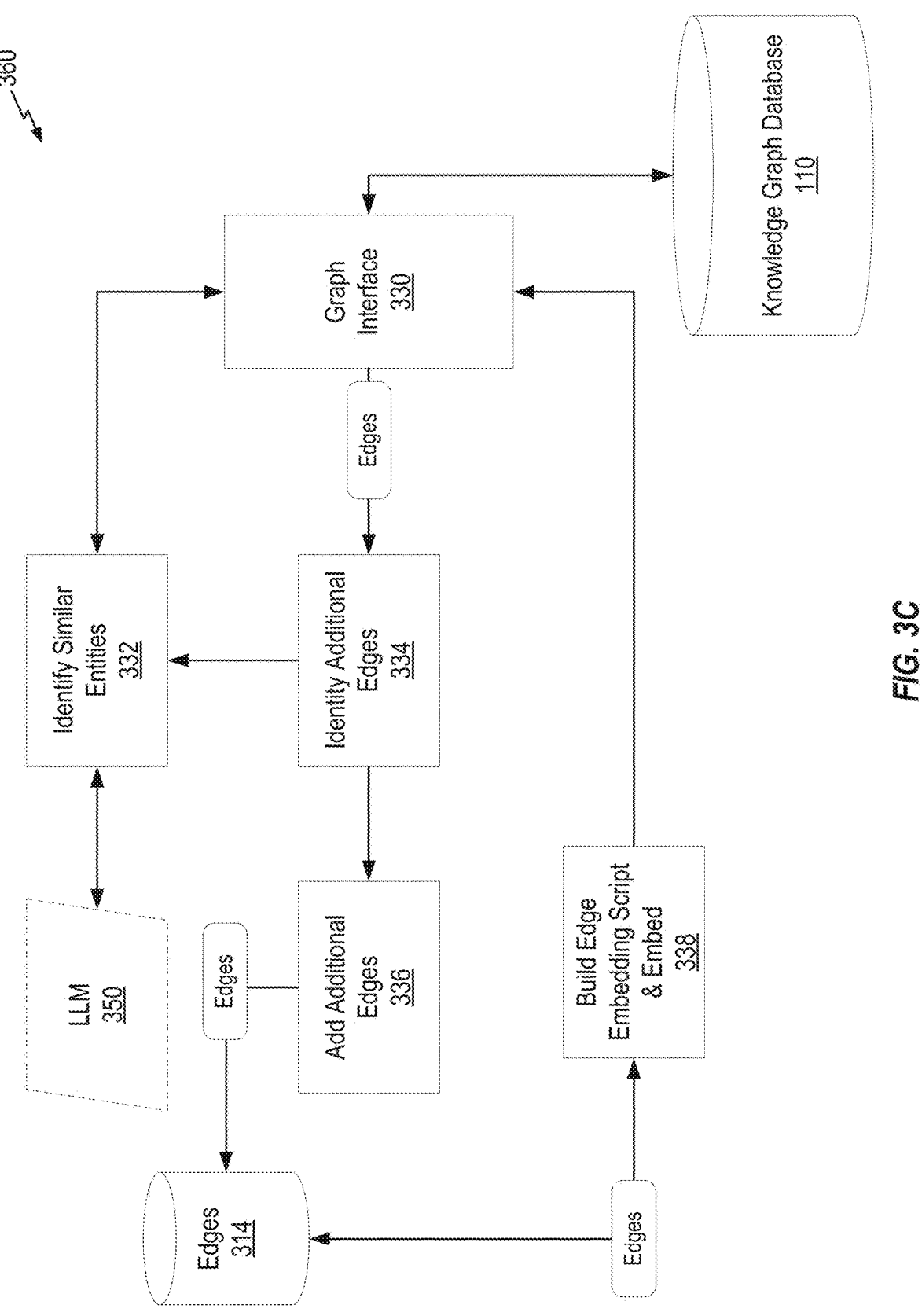
FIG. 3C depicts an example method for generating cross-document associations in a knowledge graph.

FIGS. 3A-3C depict example methods for generating, maintaining, and utilizing a knowledge graph database 110. In certain aspects, these methods may be performed by the difference analyzer component 112 in FIG. 1.

Initially, and as depicted in FIG. 3A, the extracted content according to the extraction capture schema described with respect to FIG. 2E is transformed and embedded into the knowledge graph database 110 in example method 300. At step 304, the extracted content is interpreted to identify documents, pages, chunks, and segments, and their associations.

At block 306, the documents, pages, chunks, and segments are transformed into entities for embedding into the knowledge graph database 110. An entity is a fundamental component representing each distinct chunk or segment and its identity and attribute(s). In some cases, an entity may be referred to as a node of the knowledge graph. Each entity has a unique identifier distinguishing it from other entities. Example identifiers may include uniform resource identifiers (URI), an identification label, name, and the like. An entity may have one or more attributes, or properties, which describes aspects or characteristics of the entity. For example, a "person" entity may have attributes including name, birthdate, and occupation. An entity may be classified into different categories and each category of entity may have a set of relevant attributes and possible edges.

In some aspects, an entity may represent a document, for example, document 102. In some aspects, an entity may represent one or more pages of a document. In some aspects, an entity may represent a portion of a document, for example, a chunk of text. In some aspects, an entity may represent a unit of a document, for example, a segment of text.

At block 308, the associations are transformed into edges for embedding into the knowledge graph database 110. An edge is the relationship between two or more linked entities. An edge describes how the linked entities are related to one another. For example, a "person" entity may be connected to a "company" entity through a "works for" edge.

Together, the edges and entities represent a network of interconnected information. Thus, the segments and the associations forming each document may be embedded into the knowledge graph database 110.

Accordingly, content from documents may be embedded into the knowledge graph database 110 for difference analysis. By embedding chunks and segments into the knowledge graph database 110, even minute differences may be determined.

At block 310, one or more of the entities and/or edges may be adjusted. Adjustments may include cleaning the data, normalizing the data, aggregating the data, and/or other formatting adjustments. For example, data cleaning may include removing duplicates, correcting errors, or filling in missing values. Data normalization may include, for example, adjusting values to a common scale or format, such as standardizing date formats, currency values, scaling values, and the like. Data may be aggregated across the extraction capture schema, for example, summarizing or combining data including totaling, averaging, and the like. Other adjustments may include changing the structure or schema of the data to fit the formatting schema of the knowledge graph database 110.

At block 312, a knowledge graph embedding script is built for the entities and edges. The knowledge graph embedding script may ensure entities and edges are embedded into the knowledge graph database 110 according to the requirements and schema of the knowledge graph database 110. In some aspects, the knowledge graph embedding script is configured to bulk embed batches of new documents, for example, a set of related documents. In some aspects, the knowledge graph embedding script is configured to incrementally embed new documents as they become available. Example knowledge graph embedding scripts may include Cypher, Gremlin, SPARQL, GraphQL, Folksonomy Query Language, Graph Query Language, SQL with graph extensions, datalog, Resource Description Framework, and the like.

At block 314, the entities and edges are embedded (e.g., loaded) into the knowledge graph database 110. The entities and edges are embedded into the knowledge graph database 110 according to the knowledge graph embedding script. New entities are added to the knowledge graph database 110 and new edges are added to the knowledge graph database 110 to connect the new entities. In some aspects, the entities and edges may be validated to ensure the new data conforms to the constraints and/or integrity rules of the knowledge graph database 110.

Method 300 is just one example of a method for transforming and embedding the knowledge graph database 110, and other methods including additional and/or fewer steps may be considered.

Figure 5:
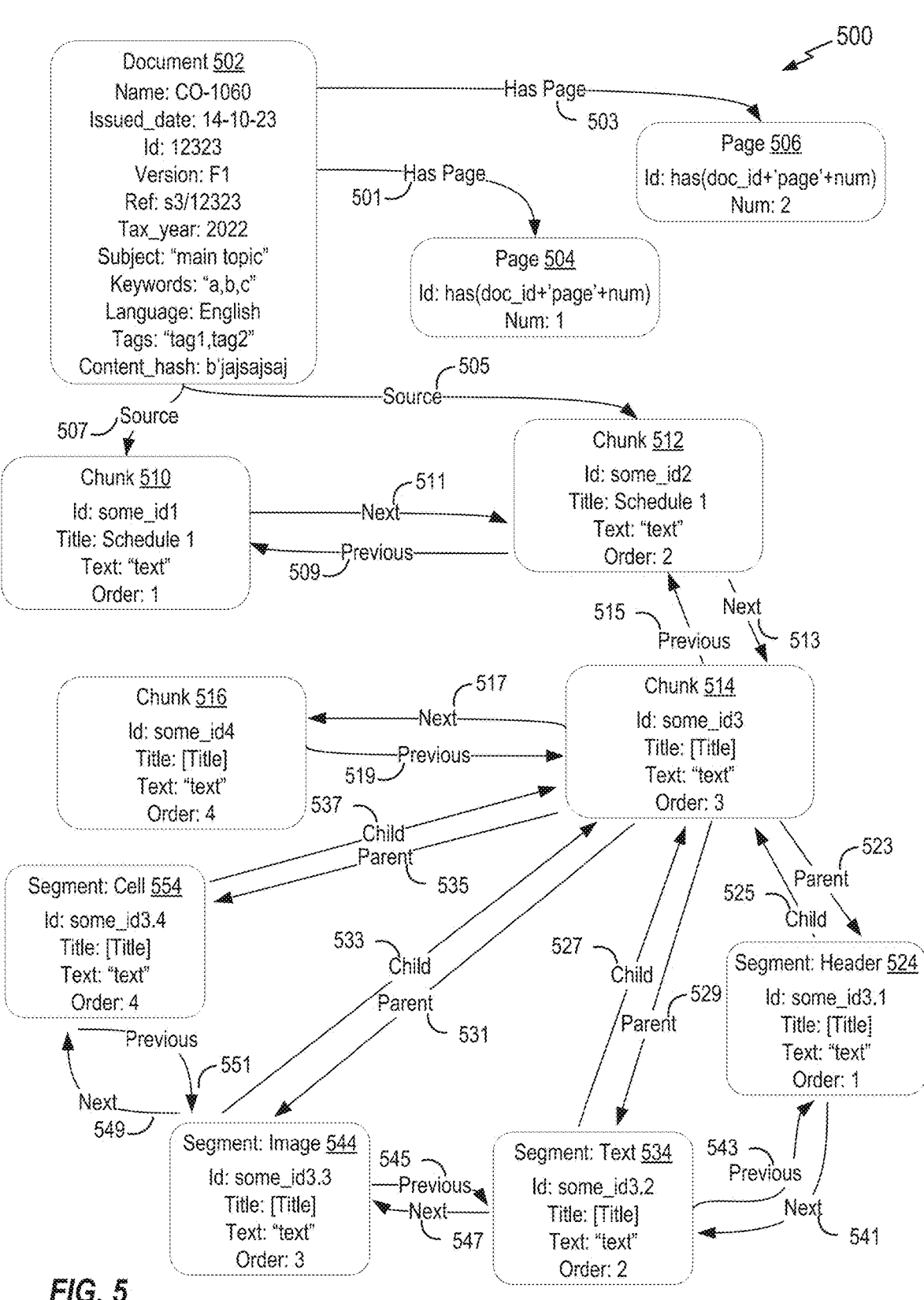
FIG. 5 depicts an example knowledge graph.

FIG. 5 depicts an example knowledge graph 500, which may be an example of a knowledge graph stored in knowledge graph database 110. Document entity 502 represents an example document, such as document 102 described with respect to FIG. 1, and has several attributes. In particular, the document entity includes the attributes of a name, issued date, identification, version, reference number, an applicable tax year, a subject, one or more keywords, language, one or more tags, and a content hash. FIG. 5 depicts example attributes associated with a tax document, and fewer or additional attributes may be included with an entity. Further, in various examples, documents may be associated with additional or fewer, including domain-specific, attributes. For example, for a research article document, the attributes may include name, publication date, journal name, identifier, authors, affiliations, issue date, journal identifier, references, acknowledgements, one or more tags, subject, one or more keywords, and the like.

In example knowledge graph 500, the document entity 502 may be associated, through edge connections with one or more other entities. In particular, the document entity 502 is connected by an edge 501 to a first page entity 504, representing a page of the document represented by document entity 502 with a "has page" relationship. The first page entity 504 includes an identifier attribute, and a number of the page attribute. The document entity 502 is also connected with a second page entity 506, by an edge 503 representing a page of the document entity 502 with a "has page" relationship. The second page entity 506 includes an identifier attribute, and a number of the page attribute.

The knowledge graph 500 also includes chunks of the document, including a first chunk entity 510 and a second chunk entity 512. The first chunk entity 510 includes an identifier attribute, a title attribute, a text attribute, and an order attribute. The second chunk entity 512 includes an identifier attribute, a title attribute, a text attribute, and an order attribute. Each of the first chunk entity 510 and the second chunk entity 512 represent entities of the document represented by document entity 502 and are connected each by an edge, in particular, edge 505 indicating a "source" relationship, and edge 507 indicating a "source" relationship. First chunk 510 is connected to second chunk 512 by edges indicating an arrangement between the two chunks within the document, specifically, indicating the second chunk 512 is subsequent to the first chunk entity 510. An edge 509 indicates the first chunk entity 510 is previous to the second chunk entity 512. Similarly, an edge 511 indicates the second chunk entity 512 is next after the first chunk entity 510.

In this example, the document further includes additional chunks, represented by third chunk entity 514 and fourth chunk entity 516. Third chunk entity 514 includes an identifier attribute, a title attribute, a text attribute, and an order attribute. The third chunk entity 514 includes a set of edges, edge 513 indicating the arrangement of third chunk entity 514 as next after second chunk entity 512, and edge 515 indicating the second chunk entity 512 as previous to third chunk entity 514. Fourth chunk entity 516 includes an identifier attribute, a title attribute, a text attribute, and an order attribute. Fourth chunk entity 516 is next after third chunk entity 514 as indicated by an edge 517; third chunk entity 514 is previous to fourth chunk entity 516 as indicated by an edge 519.

In this example, third chunk entity 514 has subcomponents, specifically, the chunk comprises a set of segments forming the chunk, e.g., the chunk of text of the document represented by third chunk entity 514. The segments are represented by first segment entity 524, second segment entity 534, third segment entity 544, and fourth segment entity 554. Each segment entity in this example includes an identifier attribute, a title attribute, a text attribute, and an order attribute. In this example, first segment entity 524 represents a header of the third chunk. The first segment entity 524 is connected to the third chunk entity 514 by a set of edges, an edge 523 indicating the third chunk entity 514 is a parent to the first segment entity 524, and an edge 525 indicating the first segment entity 524 is a child of the third chunk entity 514.

The next subcomponent, the second segment entity 534 is connected to the first segment entity 524 by a set of edges, an edge 543 indicating the first segment entity 524 is previous to the second segment entity 534, and an edge 541 indicating the second segment entity 534 is next after the first segment entity 524. In this example, the second segment entity 534 represents a first portion of text of the third chunk. The second segment entity 534 is connected to the third chunk entity 514 by a set of edges, an edge 529 indicating the third chunk entity 514 is a parent of the second segment entity 534, and an edge 527 indicating the second segment entity 534 is a child of the third chunk entity 514.

The next subcomponent, the third segment entity 544 is connected to the second segment entity 534 by a set of edges, an edge 547 indicating the third segment entity 544 is next after the second segment entity 534, and an edge 545 indicating the second segment entity 534 is previous to the third segment entity 544. In this example, the third segment entity 544 represents an image of the third chunk. The third segment entity 544 is connected to the third chunk entity 514 by a set of edges, an edge 531 indicating the third chunk entity 514 is a parent of the third segment entity 544, and an edge 533 indicating the third segment entity 544 is a child of the third chunk entity 514.

The last subcomponent, the fourth segment entity 554 is connected to the third segment entity 544 by a set of edges, an edge 549 indicating the fourth segment entity 554 is next after the third segment entity 544, and an edge 551 indicating the third segment entity 544 is previous to the fourth segment entity 554. In this example, the fourth segment entity 554 represents a second text portion of the third chunk. The fourth segment entity 554 is connected to the third chunk entity 514 by a set of edges, an edge 535 indicating the third chunk entity 514 is a parent of the fourth segment entity 554, and an edge 537 indicating the fourth segment entity 554 is a child of the third chunk entity 514.

FIG. 3B depicts an example method 340 for eliminating duplicate entities within the knowledge graph database 110. At block 320, recent additions to the knowledge graph database 110 are identified using a graph interface 330. The graph interface 330 may facilitate query, API, management, data import/export, and other tools for querying and updating a graph database. The recent additions identified may include recently added entities to the knowledge graph database 110. For example, recent additions may be identified as entities added in a recent bulk embed into the knowledge graph database 110. As another example, recent additions may be identified as entities added in a certain time period, for example, a prior five minutes, prior one hour, prior one day, prior one week, and the like.

Based on the identified recent additions, at block 322, a query for similar entities within the knowledge graph database 110 may be executed by graph interface 330. The query may return one or more similar entities identified within the knowledge graph database 110. In some aspects, similar entities may be identified based on matching one or more attributes between two entities, for example, text or value matching.

At block 324, the similar entities and the recent additions are compared to determine one or more duplicate entities. Duplicates may be determined based on comparing attributes of identified similar entities. For example, entities determined to be duplicates are those where the entities are from the same version of the document, and contain the same attributes, associations, and the like.

Based on one or more identified duplicates, an update embedding script may be built at block 326 to remove duplicate entities and edges. The update embedding script may be similar to the embedding script built at block 312; however, the update embedding script is configured to remove duplicate entities and edges within the knowledge graph database 110.

At block 328, the update embedding script is executed, and the updates to remove duplicate entities and edges are processed by the graph interface 330 on the knowledge graph database 110.

Method 340 is just one example of determining and removing duplicate entities within the knowledge graph database 110, and other methods, including additional and/or fewer steps may be considered.

Figure 4:
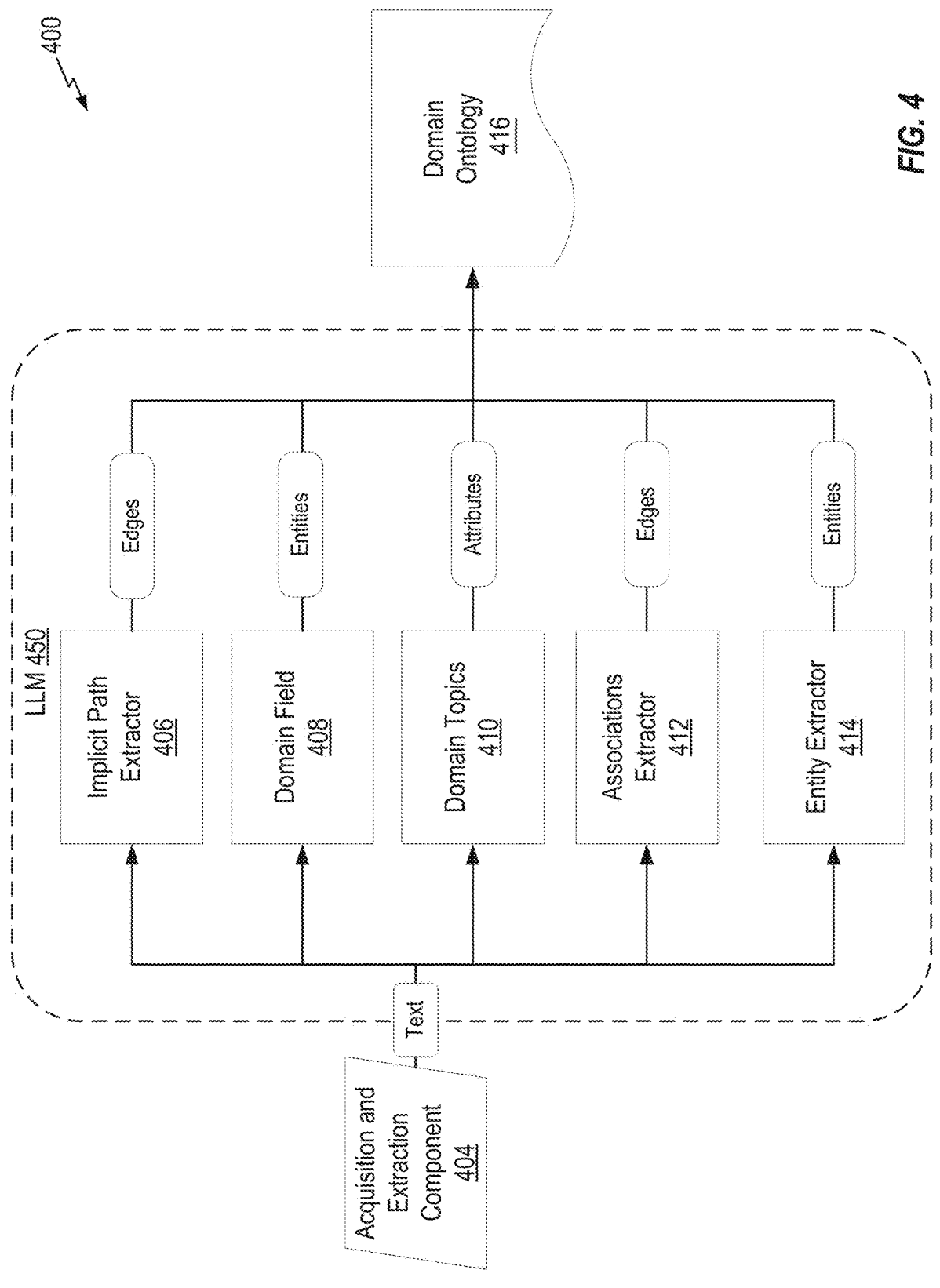
FIG. 4 depicts an example workflow for extracting domain knowledge for embedding in a knowledge graph.

FIG. 3C depicts an example method 360 for creating cross-document associations between similar documents embedded in the knowledge graph database 110. Beneficially, method 360 enables associations between segments of different documents, including other document types within a domain. Further, a domain ontology may be utilized to facilitate cross-document association generation based on domain knowledge captured by the knowledge graph database 110. FIG. 4 depicts an example method for extracting domain knowledge for a domain ontology.

At block 332, similar entities are identified within the knowledge graph database 110 using the graph interface 330. Similar entities may be identified in various ways, for example, using a natural language processing techniques to identify relevant entities or proximate entities. In some embodiments, a machine learning model, such as LLM 350, is used to identify similar entities.

In some aspects, a similar entity may be determined based on a proximity between a first entity and a similar entity within the knowledge graph database 110. Proximity of entities refers to the closeness or nearness of entities within the knowledge graph database 110 based on the relationships and connectivity embedded within the knowledge graph database 110. Thus, entities within a proximity of one another may be related to similar information, content, and interactions. In some aspects, proximity may be measured based on the distance between two entities within the knowledge graph database 110.

In some aspects, semantic search is used to identify similar entities. A semantic search uses the intent and context of a query to identify relevant search results. As used herein, a query may be to identify similar entities by using the context of the entities. Semantic search may utilize techniques such as cosine similarity and Euclidean distance to identify similar entities based on a proximity of the entities.

In some aspects, a similar entity may be determined based on a relevance between a first entity and a similar entity within the knowledge graph database 110. Relevant nodes in the knowledge graph database 110 may be those that are meaningful in the context of the specific domain. Their relevance can depend on various factors, including the domain, the structure of the graph, the attributes of the nodes, and the relationships between them. In some aspects, named entity recognition is used to identify relevant entities. For example, named entity recognition is an NLP technique to identify and classify named entities in text into predefined categories. A named entity may be an object or concept, such as a person, organization, product, location, date, or other domain-specific concepts. For example, in some aspects, an entity within the knowledge graph database 110 may be a named entity. Named entities are identified and then classified to assign a category label to the named entity. Classification utilizes the context of the named entity, for example, the attributes of the entity and the associations of the entity, to assign the category label. In some cases, classification may be done using a machine learning model, for example, LLM 350.

In some aspects, other clustering techniques are used to identify similar entities. For example, clustering techniques such as density-based clustering, community detection, and spectral clustering, may be utilized to identify proximate entities.

At block 334, additional associations may be identified based on the similar entities, for example, associations linking subcomponents of related entities (e.g., segments of related chunks, pages or related documents, etc.). Thus, additional and further associations between related content may be reflected in the knowledge graph database 110.

At block 336, these additional associations are transformed to edges 314 and at block 338, an edge embedding script is built for embedding the additional edges into the knowledge graph database 110 using the graph interface 330.

Thus, beneficially, method 360 enables modelling abstracted and additional relationships between components of documents. Further, by determining the relationships of the constituent parts across documents within a domain, method 360 may facilitate improved determination of significances, as described below with respect to FIG. 6.

Method 360 is just one example of creating associations between similar documents embedding in the knowledge graph database 110, and other methods, including additional and/or fewer steps may be considered.

Example Domain Ontology Builder Method

FIG. 4 depicts an example workflow 400 for extracting domain knowledge for a domain ontology of a knowledge graph database, e.g., knowledge graph database 110. A domain ontology provides standardization and structure for the knowledge graph database. In some examples, a domain ontology may define key concepts and properties through a standardized vocabulary or dictionary. Further, in some examples, a domain ontology may define one or more types of associations to be embedded in the knowledge graph database. For example, an ontology may have a hierarchical structure, categorizing entities into classes and subclasses. This hierarchy aids in organizing data within the knowledge graph. Further, a domain ontology may define attributes for concepts to be determined based on the extracted text for storing in the knowledge graph database.

Acquisition and Extraction Component 404 is configured to extract text from a document, for example, document 102 in FIG. 1. Acquisition and Extraction Component 404 may be an example of the acquisition and extraction component 104 in FIG. 1. In some aspects, Acquisition and Extraction Component 404 is configured to extract text from a document as described with respect to method 200 in FIG. 2A, method 220 in FIG. 2B, method 240 in FIG. 2C, or method 260 in FIG. 2D.

An LLM 450 is prompted to analyze the extracted text to form domain ontology 416 for defining and structuring embedding for the knowledge graph database 110, such as described with respect to method 300 in FIG. 3A. For example, extract key concepts and associations between the concepts, as well as properties and association types to be used in the knowledge graph database.

For example, the LLM 450 may be prompted to define one or more implicit paths at block 406, that is, a sequence or hierarchy of connections between entities which can be inferred based on the associations defined in the ontology.

The LLM 450 may be additionally prompted to define one or more domain fields which may be entities based on key concepts within the domain at block 408. Domain fields may include concepts, terminologies, practices, and methodologies relevant to that domain. For example, for a tax field, key concepts may include taxpayers, deductions, credits, and the like.

The LLM 450 may be additionally prompted to define one or more domain topics which may be attributes of entities within the domain at block 410. Domain topics may include categories or other properties of key concepts for the domain. For example, domain topics may include tags, keywords, subjects, form sets, and the like.

The LLM 450 may be additionally prompted to define one or more types of associations for the domain at block 412. Associations for the domain may include connections between the domain fields. For example, associations may include hierarchical associations, such as parent-child connections, sequential associations such as prior and subsequent connections, page connections, or document set connections.

The LLM 450 may be additionally prompted to define one or more types of entities for the domain at block 414. For example, entity types may include documents, pages, segments, chunks, as well as concepts such as taxpayers, tax rates, deductions, credits, income sources, and the like.

Workflow 400 is just one example for creating a domain ontology, and other methods including additional and/or fewer steps may be considered.

Thus, beneficially, workflow 400 enables modeling domain knowledge within the knowledge graph database 110 for improved determination of differences, for example, based on different associations between the same or similar components. Further, domain knowledge-based associations may facilitate improved determination of significances, as described below with respect to FIG. 6.

Example Difference and Significance Analysis Method

FIG. 6 depicts an example method 600 for determining a difference between documents (or sets of documents) and determining a significance of the determined difference using a knowledge graph database, such as knowledge graph database 110. In some aspects, the difference analyzer component 112 and the significance analyzer component 114 of FIG. 1 may be configured to perform aspects of method 600.

At block 602, one or more links are predicted for the knowledge graph database 110. Links may be predicted for segment entities and chunk entities of the knowledge graph database 110 because segments and chunks may represent fundamental units of information of the document, whereby a difference may be determined. In some aspects, a same, similar, or no link between two or more segments may be predicted using link prediction. As described herein, link prediction may utilize a GNN, for example, HashGNN, FastRP, or Relational GNN. A GNN utilizes both the semantics of the segment itself, and the context of the document and domain, as embedded in the knowledge graph database 110.

A HashGNN is a machine learning model based on a neural network; however, unlike traditional neural networks, a HashGNN circumvents model training. Rather, a HashGNN uses a randomized hashing scheme, called Min-Hashing, to hash entity vectors with the probability of their similarity. Thus, each entity may be embedded without needing to directly compare each entity against one another, such as through cosine similarity. MinHashing approximates the Jaccard similarity of two sets. The Jaccard similarity measures the intersection of two sets by dividing the intersection size by their union, or number of unique elements present in the two sets. MinHashing reduces the dimensionality of the problem by representing sets with shorter min-hash signatures, making it computationally efficient to compare large numbers of sets. Thus, to estimate the similarity between two sets, their minhash signatures may be compared. The similarity between the signatures approximates the Jaccard similarity between the original sets.

The minhash signatures are passed to the neighbors of each node vector. The neighbors of a node comprise all nodes directly connected by an edge to the node. Thus, for each node, all the signatures from all directly connected (e.g., by edges) neighbors of the node are aggregated into a single binary vector. The single binary vector is hashed to form a neighbor vector.

Each node and neighbor vector is combined to form a new node vector. This is repeated for a number of iterations. At each iteration, the new node will have the influence of its own features and its neighbors' features. Thus, for each subsequent iteration, the information from the neighbors' neighbors will be captured.

To predict a link between two entities, the embedding of the entities as nodes are combined, and a model predicts a score or probability of the combined embedding of the node pair. Thus, the score may indicate a likelihood that a link exists between the two entities. A link may be assigned to the two entities based on the score.

In this example, a link for a pair of entities may be predicted as a same link, a similar link, or no link, for example, based on the predicted score.

In some aspects, FastRP may be utilized to predict a link for a pair of entities. FastRP generates and uses random projection to dimensionality reduce high-dimensional data to a lower-dimensional space using random matrices. It preserves the distances between data points with high probability, which is useful for tasks like similarity computation. This is achieved by multiplying the node feature vectors with a random projection matrix. FastRP incorporates graph structural information by aggregating node features and neighborhood information. This allows the embeddings to capture both the node's attributes and its context within the graph.

The embeddings of the pair of nodes to be linked are combined using methods such as concatenation, element-wise multiplication, or other aggregation techniques. This combined representation captures information about the potential link between these nodes. A machine learning model or scoring function predicts the probability or score of a link between the pair of nodes. A link may be assigned to the two entities based on the score.

In some aspects, a relational GNN may be used to predict a link for a pair of entities. A relational GNN is a type of graph neural network designed to handle graphs with multiple types of edges or relations between nodes. They are particularly useful in scenarios where the graph structure includes diverse relationships.

Each type of edge in the graph has a corresponding message function that aggregates information from neighboring nodes. These functions are designed to handle the specific type of relationship embedded as the edge. Messages from different types of edges are aggregated separately before being combined. This ensures that each type of relationship contributes appropriately to the node's updated representation.

During each iteration of the neural network, messages are passed along edges according to their types. For example, messages might be passed differently for "friend" edges compared to "follows" edges. After aggregating messages from neighboring nodes, the node's feature vector is updated. This updated vector now reflects information from its neighbors and the types of relationships involved.

The embeddings of the pair of nodes to be linked are combined using methods such as concatenation, element-wise multiplication, or other aggregation techniques. This combined representation captures information about the potential link between these nodes. A machine learning model or scoring function predicts the probability or score of a link between the pair of nodes. A link may be assigned to the two entities based on the score.

Figure 7:
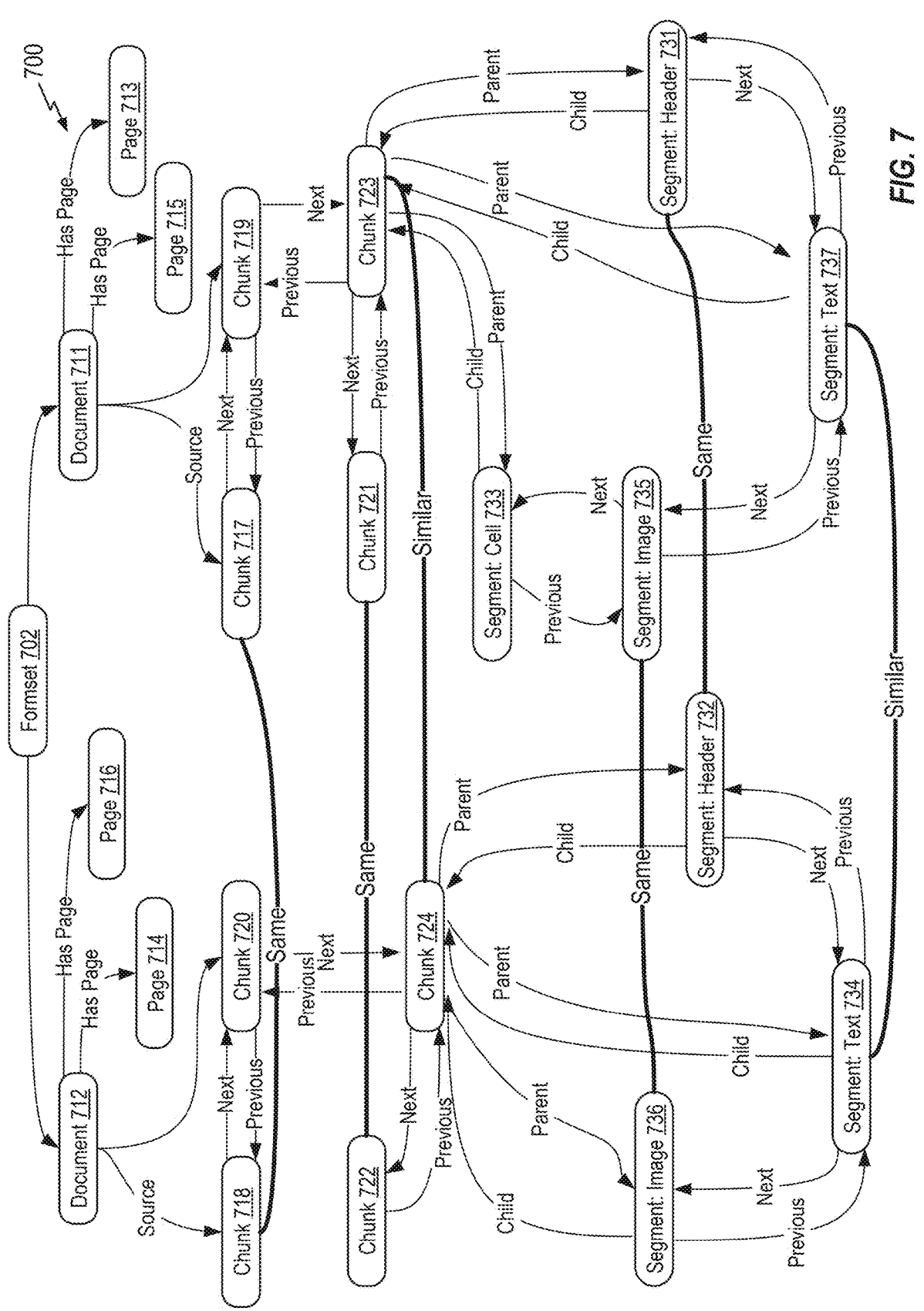
FIG. 7 depicts an example knowledge graph annotated with predicted difference links.

For example, FIG. 7 depicts an example knowledge graph 700 comprising predicted links (e.g., same, similar, or no link). The knowledge graph 700 comprises embeddings representing a form set 702 comprising a first document 711 and a second document 712. First document 711 includes a first page 715, a second page 713, and four chunks: first chunk 717, second chunk 719, third chunk 721, and fourth chunk 723. The fourth chunk 723 includes four segments: header segment 731, text segment 737, image segment 735, and cell segment 733.

Second document 712 also includes two pages, first page 714 and second page 716, as well as four chunks: first chunk 718, second chunk 720, third chunk 722, and fourth chunk 724. The fourth chunk 724 includes three segments; image segment 736, text segment 734, and header segment 732.

Further, FIG. 7 depicts example links predicted between chunks and segments of the knowledge graph 700, for example, through a GNN as described with respect to block 602 of FIG. 6. For example, first chunk 718 and first chunk 717 have a predicted "same" link. Third chunk 721 and third chunk 722 also have a predicted "same" link.

Fourth chunk 724 and fourth chunk 723 have a predicted "similar" link. In this example, fourth chunk 724 is associated with three segments: header segment 732, text segment 734, and image segment 736, while fourth chunk 723 is associated with four segments: header segment 731, text segment 737, and image segment 735. Thus, these two chunks are not the same because the fourth chunk 724 is missing a cell segment. Further, cell segment 733 has no predicted links. Thus, a difference may be identified based on the "similar" link between fourth chunk 724 and fourth chunk 723, as well as no link for cell segment 733. This may represent a deletion of the cell segment 733 from the second document 712.

Further, image segment 736 and image segment 735 have a predicted "same" link. Header segment 732 and header segment 731 also have a predicted "same" link. However, text segment 737 and text segment 734 have a predicted "similar" link. This indicates a difference between text segment 737 and text segment 734, for example, a syntactic change of the text comprising the segment.

Returning to FIG. 6, at block 604, one or more differences are determined based on the predicted links for the knowledge graph database 110. For example, a similar link or no link may indicate a difference in the entity. A same link, however, may indicate no difference in an entity.

Accordingly, by using a knowledge graph and link prediction to determine the differences at the subcomponent level, a variety of types of differences may beneficially be determined. In particular, differences including both syntactic word or sentence changes, as well as semantic differences including content changes, may be determined. Moreover, aspects enable determining ancillary differences based on associations between related, but different pieces of content across documents. Beneficially, then, an increased number and type of differences may be determined.

At block 606, each entity and its one or more edges associated with a difference are extracted from the knowledge graph database 110. For example, each entity and associated attributes may be queried, as well as all the edges, indicating associations with other entities. In some aspects, the type of difference, e.g., a similar link or no link, may be extracted as well.

At block 608, a difference is catalogued. A catalog may include information about the entity with the difference, the document, and associated entities. The catalog may further include information about a prior version (e.g., the document without the difference). For example, a difference may be a syntactic difference, a semantic difference, or an arrangement difference. A difference may be a word-level difference or a sentence-level difference.

At block 610, the determined differences for a document may be scored and ranked. A difference may be assigned an impact score based on various criteria, for example, criteria associated with the attributes of the segment, criteria associated with the domain, criteria associated with follow-on components and/or processes, and the like. Differences may then be ranked based on the assigned impact score. For example, a difference may have a higher rank (and impact score) where the difference is associated with a central concept within the domain. As another example, a difference may have a lower rank (and impact score) where the difference is a character-level difference in an attribute of the segment.

In some aspects, an impact score may be determined based on the number and/or type of associations, and/or the number and/or type of associated entities, with the entity with the difference. For example, a difference entity associated with a high number of associated entities may have a high impact score. As another example, a difference entity with a high number of child associations may have a high impact score. Yet another example, a difference entity with low number of associations may have a low impact score.

In some aspects, differences may be ranked based on the impact score. In some aspects, a significance may be determined based on a ranking of the difference, for example, a highly ranked difference may be determined to be significant. In some aspects, a low-ranked difference may be determined to be of low significance or insignificant.

In some aspects, a difference may be determined to be significant at block 610 based on the assigned impact score for a difference. In some aspects, a significance may be based on the assigned impact score satisfying a threshold. In some aspects, a difference may be determined to be insignificant or have low significance where the impact score of the difference does not satisfy the threshold.

At block 612, a significance may be determined based on processing the difference with LLM 620. In some aspects, the LLM may be trained to determine a significance based on the content of the segment with a difference, for example, using impact analysis to evaluate direct and indirect repercussions of the difference. For example, a deletion difference that removes a section of text from a form document may be processed by an LLM to determine the content deleted from the form document and one or more effects of the deleted content on the rest of the form, and/or related forms. In some aspects, a significant difference may indicate there is a repercussion due to the difference. For example, a significant difference may indicate a change in legal, financial, tax, or other status based on the difference. In some aspects, a repercussion may include an effect of the difference on the content itself, for example, a change in the meaning or interpretation of the content. In some aspects, a repercussion may include an effect of the difference on another component of the document, for example, a change in the meaning or interpretation of the other section in light of the difference. In some aspects, a repercussion may include an effect of the difference on another document, for example, a change in the meaning or interpretation of another document in light of the difference.

Beneficially, determining significances associated with the determined differences enables determining which differences may affect other components or processes, or otherwise impact the content of the document. Further, differences that are not significant or have low significance (e.g., an impact score below a threshold), for example, trivial changes such as corrections of typos, formatting, and the like, may be separated and not acted upon.

For example, the difference and the significance may be outputted at block 614 to the updating component 116 in FIG. 1 for updating a follow-on process. A significance may, in some aspects, affect other systems, people, and/or actions, such as follow-on processes, decisions, and behavior which may be updated by the difference. Accordingly, rapid implementation of content changes may be achieved, and the changes may be effectuated to a large number of processes and components automatically.

Method 600 is just one example of determining differences and significances for documents, and other methods including additional and/or fewer steps may be considered.

Example Method for Identifying Content Differences Between Two or More Documents FIG. 8 depicts an example method 800 for identifying content differences between two or more documents. In some aspects, method 800 may be implemented by the system 100 of FIG. 1 and/or processing system 900 of FIG. 9.

Initially, method 800 begins at step 802 with embedding a set of source documents into a knowledge graph, wherein each source document is embedded in the knowledge graph as a set of segments and a set of associations, wherein each association connects two or more segments of the set of segments. Document 102 in FIG. 1 may be an example of a source document.

In some aspects, embedding the set of source documents into the knowledge graph comprises: generating a first set of segments and a first set of associations of the first source document; and embedding the first set of segments and the first set of associations into the knowledge graph, wherein each segment of the set of segments is embedded in the knowledge graph as an entity, and each association in the set of associations is embedded in the knowledge graph as an edge connecting two or more entities, such as described with respect to FIG. 3A. An example knowledge graph is depicted in FIG. 7.

In some aspects, the first source document comprises a machine-readable text.

In some aspects, the first source document comprises an image-based source document, and the method 800 further comprises: performing optical character recognition, comprising: scanning an image representing the first source document; executing text recognition to identify text within the first source document; and converting the text within the first source document to machine-readable text, such as described with respect to FIGS. 2A-2B.

In some aspects, generating the first set of segments and the first set of associations comprises: extracting, with a machine learning model, one or more words, fields, labels, or headers within the first source document; determining, with the machine learning model, a relationship between the one or more words, fields, labels, or headers, wherein the relationship is based on at least one of a spatial location of the one or more words, fields, labels, or headers within the first source document or a content of the one or more words, fields, labels, or headers; and determining, with the machine learning model, one or more segments of the first set of segments comprising one or more of the one or more words, fields, labels, or headers based on the relationship between the one or more words, fields, labels, or headers; and determining, with the machine learning model, one or more associations of the first set between the one or more segments based on the relationship between the one or more words, fields, labels, or headers, such as described with respect to FIGS. 2C-2D.

In some aspects, the machine learning model is a large language model (LLM).

In some aspects, method 800 further comprises eliminating a duplicate entity in the knowledge graph, comprising: identifying a newly added entity in the knowledge graph; querying the knowledge graph for a similar entity; and in response to determining that the newly added entity is equivalent to the similar entity, deleting the newly added entity in the knowledge graph and one or more edges connecting the newly added entity and one or more entities in the knowledge graph, such as described with respect to FIG. 3B.

In some aspects, method 800 further comprises determining relationships between one or more source documents in the set of source documents, comprising: determining a first set of similar entities based on a proximity of one or more entities within the knowledge graph; and adding a cross-document edge between each similar entity in the first set of similar entities, such as described with respect to FIG. 3C.

In some aspects, method 800 further comprises determining relationships between one or more source documents in the set of source documents, comprising: determining a first set of similar entities based on a relevance of one or more entities within the knowledge graph, wherein the relevance of the one or more entities is determined by a large language model (LLM); and adding a cross-document edge between each similar entity in the first set of similar entities.

Method 800 continues to step 804 with determining a difference between a first segment in the set of segments of a first source document and a second segment in the set of segments of a second source document, such as described with respect to FIG. 6.

In some aspects, determining the difference between a first segment in the set of segments of a first source document and a second segment in the set of segments of a second source document comprises: assigning a link prediction between a pair of segments in the knowledge graph with a machine learning model, wherein: the pair of segments comprises the first segment in the set of segments of the first source document and the second segment in the set of segments of the second source document, and the link prediction indicates the difference between the pair of segments.

In some aspects, the machine learning model comprises a graph neural network (GNN), for example, HashGNN, FastRP, or Relational GNN.

Accordingly, by using a knowledge graph and link prediction to determine the differences at the subcomponent level, a variety of types of differences may beneficially be determined. In particular, differences including both syntactic word or sentence changes, as well as semantic differences including content changes may be determined. Moreover, aspects enable determining ancillary differences based on associations between related, but different pieces of content across documents. Beneficially, then an increased number and type of differences may be determined.

In response to determining the difference between the first segment in the set of segments of the first source document and the second segment in the set of segments of the second source document, method 800 then continues to step 806 with determining a significance to the second source document based on one or more associations of the set of associations connected to the second segment, such as described with respect to FIG. 6.

In some aspects, determining the significance to the second source document, comprises: extracting, from the knowledge graph, at least one association of the first segment in the set of segments of the first source document and at least one association of the second segment in the set of segments of the second source document; assigning an impact score based on the at least one association of the first segment in the set of segments of the first source document and the at least one association of the second segment in the set of segments of the second source document; and ranking the difference based on the impact score; and determining the significance based on the impact score satisfying a threshold.

Beneficially, determining significances associated with the determined differences, enables determining which differences may affect other components or processes, or otherwise impact the content of the document. Further, differences which do not have significances, for example, trivial changes such as corrections of typos, formatting, and the like, may be separated and not acted upon.

In some aspects, the method 800 further comprises determining a repercussion of the difference with a large language model (LLM).

Method 800 then continues to step 808 with updating at least one follow-on procedure based on the significance to the second source document. Accordingly, rapid implementation of content changes may be achieved, and the changes may be effectuated to a large number of processes and components automatically.

Note that FIG. 8 is just one example of a method, and other methods including fewer, additional, or alternative operations are possible consistent with this disclosure.

Example Processing System for Difference Analysis

Figure 9:
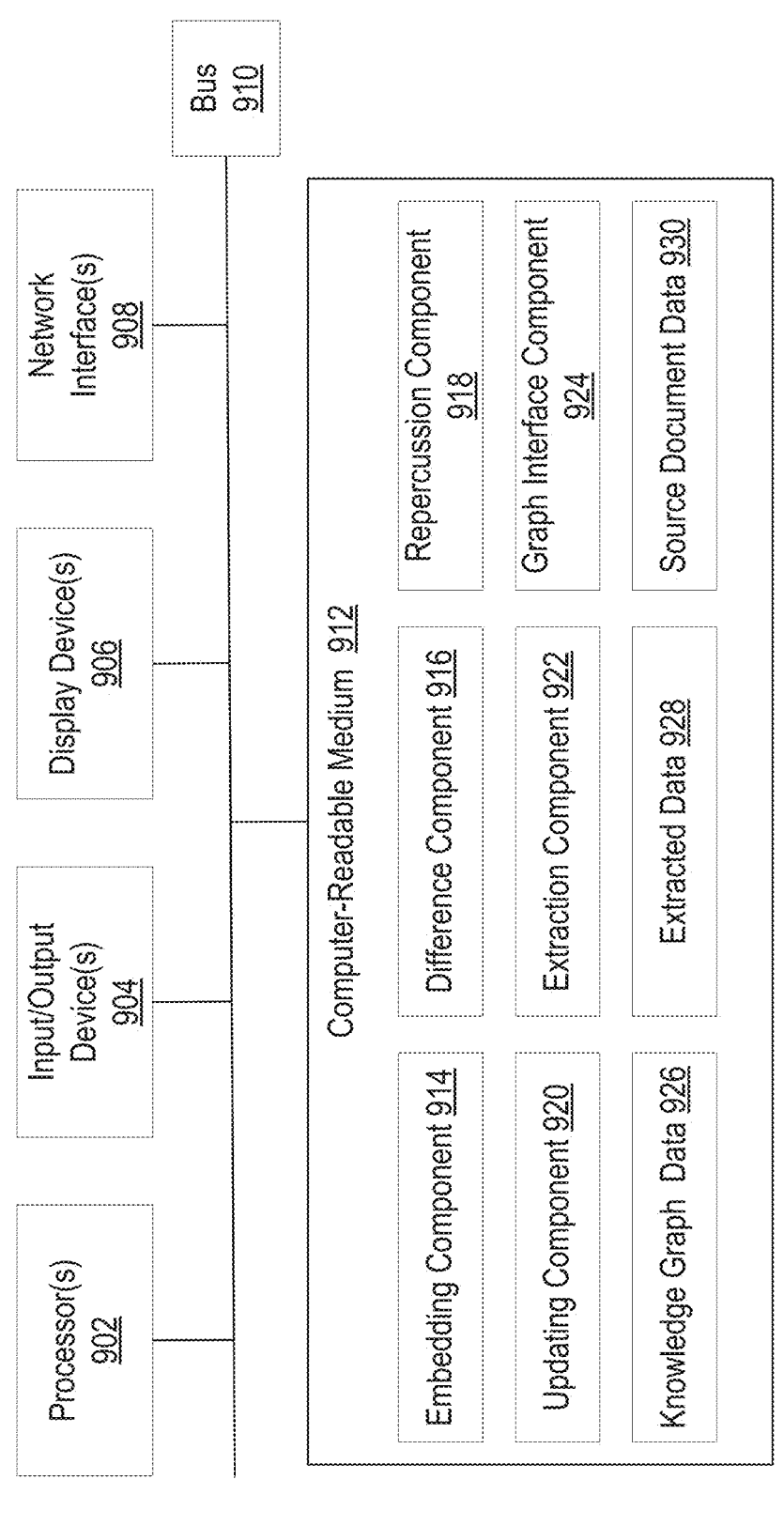
FIG. 9 depicts an example processing system with which aspects of the present disclosure can be performed.

FIG. 9 depicts an example processing system 900 configured to perform various aspects described herein, including, for example, method 800 as described above with respect to FIG. 8.

Processing system 900 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 900 includes one or more processors 902, one or more input/output devices 904, one or more display devices 906, one or more network interfaces 908 through which processing system 900 is connected to one or more networks (e.g., a local network, an intranet, the Internet, or any other group of processing systems communicatively connected to each other), and computer-readable medium 912. In the depicted example, the aforementioned components are coupled by a bus 910, which may generally be configured for data exchange amongst the components. Bus 910 may be representative of multiple buses, while only one is depicted for simplicity.

Processor(s) 902 are generally configured to retrieve and execute instructions stored in one or more memories, including local memories like computer-readable medium 912, as well as remote memories and data stores. Similarly, processor(s) 902 are configured to store application data residing in local memories like the computer-readable medium 912, as well as remote memories and data stores. More generally, bus 910 is configured to transmit programming instructions and application data among the processor(s) 902, display device(s) 906, network interface(s) 908, and/or computer-readable medium 912. In certain aspects, processor(s) 902 are representative of one or more central processing units (CPUs), graphics processing units (GPUs), tensor processing units (TPUs), accelerators, and other processing devices.

Input/output device(s) 904 may include any device, mechanism, system, interactive display, and/or various other hardware and software components for communicating information between processing system 900 and a user of processing system 900. For example, input/output device(s) 904 may include input hardware, such as a keyboard, touch screen, button, microphone, speaker, and/or other device for receiving inputs from the user and sending outputs to the user.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, and/or extended reality devices. In various aspects, display device(s) 906 may be configured to display a graphical user interface.

Network interface(s) 908 provide processing system 900 with access to external networks and thereby to external processing systems. Network interface(s) 908 can generally be any hardware and/or software capable of transmitting and/or receiving data via a wired or wireless network connection. Accordingly, network interface(s) 908 can include a communication transceiver for sending and/or receiving any wired and/or wireless communication.

Computer-readable medium 912 may be a volatile memory, such as a random access memory (RAM), or a nonvolatile memory, such as nonvolatile random access memory (NVRAM), or the like. In this example, computer-readable medium 912 includes an embedding component 914, a difference component 916, a significance component 918, an updating component 920, an extraction component 922, a graph interface component 924, knowledge graph data 926, extracted data 928, and source document data 930.

In certain aspects, extraction component 922 is configured to extract text from a set of source documents stored in source document data 930. The extracted text may be stored as extracted data 928.

In certain aspects, graph interface component 924 is configured to facilitate interactions between various components and the knowledge graph data 926, for example, embedding component 914, difference component 916, and significance component 918.

In certain aspects, embedding component 914 is configured to embed the set of source documents into a knowledge graph stored as knowledge graph data 926.

In certain aspects, difference component 916 is configured to determine a difference between a first segment in the set of segments of a first source document and a second segment in the set of segments of a second source document stored in knowledge graph data 926.

In certain aspects, significance component 918 is configured to determine a significance of the second source document based on one or more associations of the set of associations connected to the second segment.

In certain aspects, updating component 920 is configured to update at least one follow-on procedure based on the significance of the second source document.

Note that FIG. 9 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method of identifying content differences between two or more documents, comprising: embedding a set of source documents into a knowledge graph, wherein each source document is embedded in the knowledge graph as a set of segments and a set of associations, wherein each association connects two or more segments of the set of segments; determining a difference between a first segment in the set of segments of a first source document and a second segment in the set of segments of a second source document; in response to determining the difference between the first segment in the set of segments of the first source document and the second segment in the set of segments of the second source document, determining a significance to the second source document based on one or more associations of the set of associations connected to the second segment; and updating at least one follow-on procedure based on the significance to the second source document.

Clause 2: The method of clause 1, wherein embedding the set of source documents into the knowledge graph, comprises: generating a first set of segments and a first set of associations of the first source document; and embedding the first set of segments and the first set of associations into the knowledge graph, wherein each segment of the set of segments is embedded in the knowledge graph as an entity, and each association in the set of associations is embedded in the knowledge graph as an edge connecting two or more entities.

Clause 3: The method of clause 2, wherein the first source document comprises a machine-readable text.

Clause 4: The method of clause 2, wherein the first source document comprises an image-based source document, and the method further comprises: performing optical character recognition, comprising: scanning an image representing the first source document; executing text recognition to identify text within the first source document; and converting the text within the first source document to machine-readable text.

Clause 5: The method of any one of clauses 2-4, wherein generating the first set of segments and the first set of associations comprises: extracting, with a machine learning model, one or more words, fields, labels, or headers within the first source document; determining, with the machine learning model, a relationship between the one or more words, fields, labels, or headers, wherein the relationship is based on at least one of a spatial location of the one or more words, fields, labels, or headers within the first source document or a content of the one or more words, fields, labels, or headers; and determining, with the machine learning model, one or more segments of the first set of segments comprising one or more of the one or more words, fields, labels, or headers based on the relationship between the one or more words, fields, labels, or headers; and determining, with the machine learning model, one or more associations of the first set between the one or more segments based on the relationship between the one or more words, fields, labels, or headers.

Clause 6: The method of clause 5, wherein the machine learning model is a large language model (LLM).

Clause 7: The method of any one of clauses 2-6, further comprising eliminating a duplicate entity in the knowledge graph, comprising: identifying a newly added entity in the knowledge graph; querying the knowledge graph for a similar entity; and in response to determining that the newly added entity is equivalent to the similar entity, deleting the newly added entity in the knowledge graph and one or more edges connecting the newly added entity and one or more entities in the knowledge graph.

Clause 8: The method of any one of clauses 2-7, further comprising determining relationships between one or more source documents in the set of source documents, comprising: determining a first set of similar entities based on a proximity of one or more entities within the knowledge graph; and adding a cross-document edge between each similar entity in the first set of similar entities.

Clause 9: The method of any one of clauses 2-8, further comprising determining relationships between one or more source documents in the set of source documents, comprising: determining a first set of similar entities based on a relevance of one or more entities within the knowledge graph, wherein the relevance of the one or more entities is determined by a large language model (LLM); and adding a cross-document edge between each similar entity in the first set of similar entities.

Clause 10: The method of any one of clauses 1-9, wherein determining the difference between a first segment in the set of segments of a first source document and a second segment in the set of segments of a second source document, comprises: assigning a link prediction between a pair of segments in the knowledge graph with a machine learning model, wherein: the pair of segments comprises the first segment in the set of segments of the first source document and the second segment in the set of segments of the second source document, and the link prediction indicates the difference between the pair of segments.

Clause 11: The method of clause 10, wherein the machine learning model comprises a graph neural network (GNN).

Clause 12: The method of any one of clauses 10-11, wherein determining the significance to the second source document, comprises: extracting, from the knowledge graph, at least one association of the first segment in the set of segments of the first source document and at least one association of the second segment in the set of segments of the second source document; assigning an impact score based on the at least one association of the first segment in the set of segments of the first source document and the at least one association of the second segment in the set of segments of the second source document; and ranking the difference based on the impact score; and determining the significance based on the impact score satisfying a threshold.

Clause 13: The method of clause 12, further comprising determining a repercussion of the difference with a large language model (LLM).

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of identifying content differences between two or more documents, comprising:

embedding a set of source documents into a knowledge graph, wherein each source document is embedded in the knowledge graph as a set of segments and a set of associations, wherein:

each segment of the set of segments represents text of a respective source document of the set of source documents, and each association of the set of associations of the respective source document connects two or more segments of the set of segments of the respective source document;

determining a difference between a pair of segments of the knowledge graph, wherein the pair of segments comprises a first segment in the set of segments of a first source document and a second segment in the set of segments of a second source document, comprising assigning a link prediction with a machine learning model, wherein the link prediction indicates the difference between the pair of segments;

in response to determining the difference between the pair of segments, determining a significance of the difference on the second source document based on one or more associations of the set of associations of the second source document connected to the second segment, wherein the significance indicates a consequence of the difference on the second source document, wherein determining the significance, comprising:

extracting, from the knowledge graph, at least one association of the first segment in the set of segments of the first source document and at least one association of the second segment in the set of segments of the second source document;

assigning an impact score based on the at least one association of the first segment in the set of segments of the first source document and the at least one association of the second segment in the set of segments of the second source document, wherein the impact score indicates a number or type of associations of the second segment effected by the difference;

ranking the difference based on the impact score; and determining the significance based on the impact score satisfying a threshold; and updating and configuring at least one follow-on procedure based on the significance on the second source document and improving identification of content and the content differences between various documents.

2. The method of claim 1, wherein embedding the set of source documents into the knowledge graph, comprises:

generating a first set of segments and a first set of associations of the first source document; and embedding the first set of segments and the first set of associations into the knowledge graph, wherein each segment of the set of segments is embedded in the knowledge graph as an entity, and each association in the set of associations is embedded in the knowledge graph as an edge connecting two or more entities.

3. The method of claim 2, wherein generating the first set of segments and the first set of associations comprises:

extracting, with a machine learning model, one or more words, fields, labels, or headers within the first source document;

determining, with the machine learning model, a relationship between the one or more words, fields, labels, or headers, wherein the relationship is based on at least one of a spatial location of the one or more words, fields, labels, or headers within the first source document or a content of the one or more words, fields, labels, or headers; and determining, with the machine learning model, one or more segments of the first set of segments comprising one or more of the one or more words, fields, labels, or headers based on the relationship between the one or more words, fields, labels, or headers; and determining, with the machine learning model, one or more associations of the first set of associations between the one or more segments based on the relationship between the one or more words, fields, labels, or headers.

4. The method of claim 2, further comprising eliminating a duplicate entity in the knowledge graph, comprising:

identifying a newly added entity in the knowledge graph;

querying the knowledge graph for a similar entity; and in response to determining the newly added entity is equivalent to the similar entity, deleting the newly added entity in the knowledge graph and one or more edges connecting the newly added entity and one or more entities in the knowledge graph.

5. The method of claim 2, further comprising determining relationships between one or more source documents in the set of source documents, comprising:

determining a first set of similar entities based on a proximity of one or more entities within the knowledge graph; and adding a cross-document edge between each similar entity in the first set of similar entities.

6. The method of claim 2, further comprising determining relationships between one or more source documents in the set of source documents, comprising:

determining a first set of similar entities based on a relevance of one or more entities within the knowledge graph, wherein the relevance of the one or more entities is determined by a large language model (LLM); and adding a cross-document edge between each similar entity in the first set of similar entities.

7. The method of claim 1, further comprising determining a repercussion of the difference with a large language model (LLM).

8. A method of identifying content differences between two or more documents, comprising:

embedding a set of source documents into a knowledge graph, wherein each source document is embedded in the knowledge graph as a set of segments and a set of associations, wherein;

each segment of the set of segments represents text of a respective source document of the set of source documents, and each association of the set of associations of the respective source document connects two or more segments of the set of segments;

determining a difference between a first segment in the set of segments of a first source document and a second segment in the set of segments of a second source document of the knowledge graph, comprising assigning a link prediction between the first segment in the set of segments of the first source document and the second segment in the set of segments of the second source document in the knowledge graph with a graph neural network, wherein the link prediction indicates the difference between the first segment in the set of segments of the first source document and the second segment in the set of segments of the second source document;

in response to determining the difference between the first segment in the set of segments of the first source document and the second segment in the set of segments of the second source document, determining a significance of the difference on the second source document based on one or more associations of the set of associations of the second source document connected to the second segment, wherein the significance indicates a consequence of the difference on the second source document, comprising:

extracting, from the knowledge graph, at least one association of the first segment in the set of segments of the first source document and at least one association of the second segment in the set of segments of the second source document;

assigning an impact score based on the at least one association of the first segment in the set of segments of the first source document and the at least one association of the second segment in the set of segments of the second source document, wherein the impact score indicates a number or type of associations of the second segment effected by the difference;

ranking the difference based on the impact score; and determining the significance based on the impact score satisfying a threshold; and updating and configuring at least one follow-on procedure based on the significance on the second source document and improving identification of content and the content differences between various documents.

9. The method of claim 8, further comprising determining a repercussion of the difference with a large language model (LLM).

10. The method of claim 8, wherein embedding the set of source documents into the knowledge graph, comprises:

generating a first set of segments and a first set of associations of the first source document; and embedding the first set of segments and the first set of associations into the knowledge graph, wherein each segment of the set of segments is embedded in the knowledge graph as an entity, and each association in the set of associations is embedded in the knowledge graph as an edge connecting two or more entities.

11. The method of claim 10, wherein generating the first set of segments and the first set of associations comprises:

extracting, with a machine learning model, one or more words, fields, labels, or headers within the first source document;

determining, with the machine learning model, a relationship between the one or more words, fields, labels, or headers, wherein the relationship is based on at least one of a spatial location of the one or more words, fields, labels, or headers within the first source document or a content of the one or more words, fields, labels, or headers; and determining, with the machine learning model, one or more segments of the first set of segments comprising one or more of the one or more words, fields, labels, or headers based on the relationship between the one or more words, fields, labels, or headers; and determining, with the machine learning model, one or more associations of the first set of associations between the one or more segments based on the relationship between the one or more words, fields, labels, or headers.

12. The method of claim 11, further comprising eliminating a duplicate entity in the knowledge graph, comprising:

identifying a newly added entity in the knowledge graph;

querying the knowledge graph for a similar entity; and in response to determining the newly added entity is equivalent to the similar entity, deleting the newly added entity in the knowledge graph and one or more edges connecting the newly added entity and one or more entities in the knowledge graph.

13. The method of claim 11, further comprising determining relationships between one or more source documents in the set of source documents, comprising:

determining a first set of similar entities based on a proximity of one or more entities within the knowledge graph; and adding a cross-document edge between each similar entity in the first set of similar entities.

14. A processing system, comprising: a memory comprising computer-executable instructions; and a hardware processor configured to execute the computer-executable instructions and cause the processing system to:

embed a set of source documents into a knowledge graph, wherein each source document is embedded in the knowledge graph as a set of segments and a set of associations, wherein:

each segment of the set of segments represents text of a respective source document of the set of source documents, and each association of the set of associations of the respective source document connects two or more segments of the set of segments;

determine a difference between a pair of segments of the knowledge graph, wherein the pair of segments comprises a first segment in the set of segments of a first source document and a second segment in the set of segments of a second source document, by assigning a link prediction with a machine learning model, wherein the link prediction indicates the difference between the pair of segments;

in response to determining the difference between the pair of segments, determine a significance of the difference on the second source document based on one or more associations of the set of associations of the second source document connected to the second segment, wherein the significance indicates a consequence of the difference on the second source document, to determine the significance, the hardware processor is further configured to cause the processing system to:

extract, from the knowledge graph, at least one association of the first segment in the set of segments of the first source document and at least one association of the second segment in the set of segments of the second source document;

assign an impact score based on the at least one association of the first segment in the set of segments of the first source document and the at least one association of the second segment in the set of segments of the second source document, wherein the impact score indicates a number or type of associations of the second segment effected by the difference;

rank the difference based on the impact score; and determine the significance based on the impact score satisfying a threshold; and update and configure at least one follow-on procedure based on the significance on the second source document and improve identification of content and the content differences between various documents.

15. The processing system of claim 14, wherein to embed the set of source documents into the knowledge graph, the hardware processor is further configured to cause the processing system to:

generate a first set of segments and a first set of associations of the first source document; and embed the first set of segments and the first set of associations into the knowledge graph, wherein each segment of the set of segments is embedded in the knowledge graph as an entity, and each association in the set of associations is embedded in the knowledge graph as an edge connecting two or more entities.

16. The processing system of claim 15, wherein to generate the first set of segments and the first set of associations, the hardware processor is further configured to cause the processing system to:

extract, with a machine learning model, one or more words, fields, labels, or headers within the first source document;

determine, with the machine learning model, a relationship between the one or more words, fields, labels, or headers, wherein the relationship is based on at least one of a spatial location of the one or more words, fields, labels, or headers within the first source document or a content of the one or more words, fields, labels, or headers; and determine, with the machine learning model, one or more segments of the first set of segments comprising one or more of the one or more words, fields, labels, or headers based on the relationship between the one or more words, fields, labels, or headers; and determine, with the machine learning model, one or more associations of the first set of associations between the one or more segments based on the relationship between the one or more words, fields, labels, or headers.

17. The processing system of claim 16, wherein the hardware processor is further configured to cause the processing system to eliminate a duplicate entity in the knowledge graph by:

identifying a newly added entity in the knowledge graph;

querying the knowledge graph for a similar entity; and in response to determining at the newly added entity is equivalent to the similar entity, deleting the newly added entity in the knowledge graph and one or more edges connect the newly added entity and one or more entities in the knowledge graph.

18. The processing system of claim 16, wherein the hardware processor is further configured to cause the processing system to determine relationships between one or more source documents in the set of source documents by:

determining a first set of similar entities based on a proximity of one or more entities within the knowledge graph; and adding a cross-document edge between each similar entity in the first set of similar entities.

19. The processing system of claim 16, wherein the hardware processor is further configured to cause the processing system to determine relationships between one or more source documents by:

determining a first set of similar entities based on a relevance of one or more entities within the knowledge graph, wherein the relevance of the one or more entities is determined by a large language model (LLM); and adding a cross-document edge between each similar entity in the first set of similar entities.

20. The processing system of claim 14, wherein the hardware processor is further configured to cause the processing system to determine a repercussion of the difference with a large language model (LLM).

\* \* \* \* \*